US011782399B1

(12) United States Patent
Buttgenbach et al.

(10) Patent No.: US 11,782,399 B1
(45) Date of Patent: Oct. 10, 2023

(54) APPLICATION FOR PRIORITY-SWITCHING DUAL-USE RENEWABLE POWER PLANT

(71) Applicant: 8ME NOVA, LLC, El Dorado Hills, CA (US)

(72) Inventors: Thomas Buttgenbach, Santa Monica, CA (US); Lukas Hansen, El Dorado Hills, CA (US); Gautham Ramesh, Emeryville, CA (US); Finbar Sheehy, San Diego, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/137,289

(22) Filed: Apr. 20, 2023

(51) Int. Cl.

| | |
|---|---|
| ***G05B 13/04*** | (2006.01) |
| ***H02J 3/32*** | (2006.01) |
| ***H02J 7/00*** | (2006.01) |
| ***H02J 3/00*** | (2006.01) |

(52) U.S. Cl.
CPC .............. *G05B 13/04* (2013.01); *H02J 3/003* (2020.01); *H02J 3/32* (2013.01); *H02J 7/0048* (2020.01); *H02J 2300/20* (2020.01)

(58) Field of Classification Search
CPC .......... G05B 13/04; G05B 3/003; G05B 3/32; G05B 7/0048; G05B 2300/20
See application file for complete search history.

(56) References Cited

U.S. PATENT DOCUMENTS

| | | | | |
|---|---|---|---|---|
| 9,627,890 | B2 * | 4/2017 | Buchstaller | H02J 3/381 |
| 10,355,611 | B2 * | 7/2019 | Nagashima | B60L 55/00 |
| 10,784,812 | B2 * | 9/2020 | Berkowitz | H02J 3/466 |
| 10,819,248 | B2 * | 10/2020 | Mousavi | H02J 3/381 |
| 11,031,781 | B1 * | 6/2021 | Zanone | H02J 3/004 |
| 11,043,809 | B1 * | 6/2021 | Akyol | H02J 3/381 |
| 11,063,554 | B1 * | 7/2021 | Hansen | H02S 50/00 |
| 11,063,556 | B1 * | 7/2021 | Piatt | H02S 50/00 |
| 11,081,887 | B1 * | 8/2021 | Buttgenbach | H02S 40/38 |
| 11,171,485 | B1 * | 11/2021 | Ramesh | H02J 3/32 |
| 11,404,871 | B1 * | 8/2022 | Hansen | H02J 3/28 |
| 11,431,169 | B1 * | 8/2022 | Buttgenbach | H02J 3/32 |
| 11,451,060 | B1 * | 9/2022 | Buttgenbach | H02J 3/38 |

(Continued)

OTHER PUBLICATIONS

Hu et al., "A model predictive control strategy of PV-Battery microgrid under variable power generations and load conditions", Dec. 2017, Applied Energy 221 (2018) 195-203. (Year: 2017).*

(Continued)

*Primary Examiner* — Mohammad Ali
*Assistant Examiner* — Kelvin Booker
(74) *Attorney, Agent, or Firm* — Foley & Lardner LLP

(57) ABSTRACT

A system for controlling power distribution between a renewable energy source (RES) that generates electrical power, a power grid, an energy storage system (ESS) coupled to and configured to store electrical power from the RES and the power grid, and a behind-the-meter (BTM) load coupled to and configured to receive electrical power from the RES, the ESS, and the power grid includes a controller. The controller includes a processor and a non-transitory computer readable storage medium comprising instructions stored thereon that, upon execution by the processor, cause the controller to determine a prioritization mode and control the flow of electrical power in the system based on the prioritization mode.

18 Claims, 8 Drawing Sheets

(56) References Cited

U.S. PATENT DOCUMENTS 11,482,864 B1 * 10/2022 Kanan .................. H02J 3/0075
2015/0148973 A1 * 5/2015 Ye ............................ H02J 1/10 700/286
2015/0256103 A1 * 9/2015 Chiang .................. H02J 3/381 307/24
2016/0118803 A1 * 4/2016 Takahashi ................ H02J 3/12 700/286
2016/0176305 A1 * 6/2016 James ...................... H02J 3/38 307/26
2016/0274653 A1 * 9/2016 Mydlil ................. G06F 1/3296
2016/0315475 A1 * 10/2016 Carlson .................... H02J 7/35
2016/0372763 A1 * 12/2016 Lu ........................ H02J 7/0045
2017/0085091 A1 * 3/2017 Kamalasadan ......... H02J 3/003
2017/0168516 A1 * 6/2017 King ........................ H02J 3/32
2019/0052094 A1 * 2/2019 Pmsvvsv .................. H02J 3/32
2020/0014212 A1 * 1/2020 Mousavi ................. H02M 7/48
2020/0259358 A1 * 8/2020 Hansen ............... H01M 10/425
2022/0052523 A1 * 2/2022 Zanone ..................... H02J 3/32
2022/0052524 A1 * 2/2022 Akyol .................. G05B 19/042
2022/0052525 A1 * 2/2022 Buttgenbach ............. H02J 3/32
2022/0376509 A1 * 11/2022 Ramesh .................... H02J 3/32
2022/0376510 A1 * 11/2022 Ramesh .................. H02S 10/12
2022/0407310 A1 * 12/2022 Guo ...................... H02J 7/0049
2022/0407313 A1 * 12/2022 Kroyzer .................... H02J 3/32

OTHER PUBLICATIONS

Eghtedarpour et al., "Control strategy for distributed integration of photovoltaic and energy storage systems in DC micro-grids", Oct. 2011, Renewable Energy 45 (2012) 96e110. (Year: 2011).*

Dasgupta et al., "Single-Phase Inverter-Control Techniques for Interfacing Renewable Energy Sources With Microgrid—Part II: Series-Connected Inverter Topology to Mitigate Voltage-Related Problems Along With Active Power Flow Control", Jun. 2010, IEEE Transactions on Power Electronics, vol. 26, No. 3 (Year: 2010).*

Das et al., "Power Flow Control of PV-Wind-Battery Hybrid Renewable Energy Systems for Stand-Alone Application", May 2017, International Journal of Renewable Energy Research S. Das and A. K. Akella, vol. 8, No. 1, Mar. 2018. (Year: 2017).*

* cited by examiner

APPLICATION FOR PRIORITY-SWITCHING DUAL-USE RENEWABLE POWER PLANT

BACKGROUND

Renewable energy power plants (REPPs) may include one or more renewable energy sources (RES), such as photovoltaic (PV) panels and wind turbines. A REPP may be configured to supply electricity to a nearby behind-the-meter (BTM) load, such as a home, commercial building, or electrolysis plant without connecting first to an electrical grid. The REPP may also be connected to a commercial electricity grid so that energy produced by the RES can be sold to the grid. The RES, the grid, and the BTM load can also be electrically coupled to an energy storage system (ESS) of the REPP, such as a battery bank. The ESS may store excess electricity generated by the RES or from the grid and may deliver the energy to the grid or the BTM load. Various factors, such as the weather, the time of day, and the time of night may affect the rate of power production by the RES. The operator of the REPP may desire to prioritize the flow of power to the BTM load, to the grid, or to the ESS based on these factors.

DETAILED DESCRIPTION

Figure 1A:
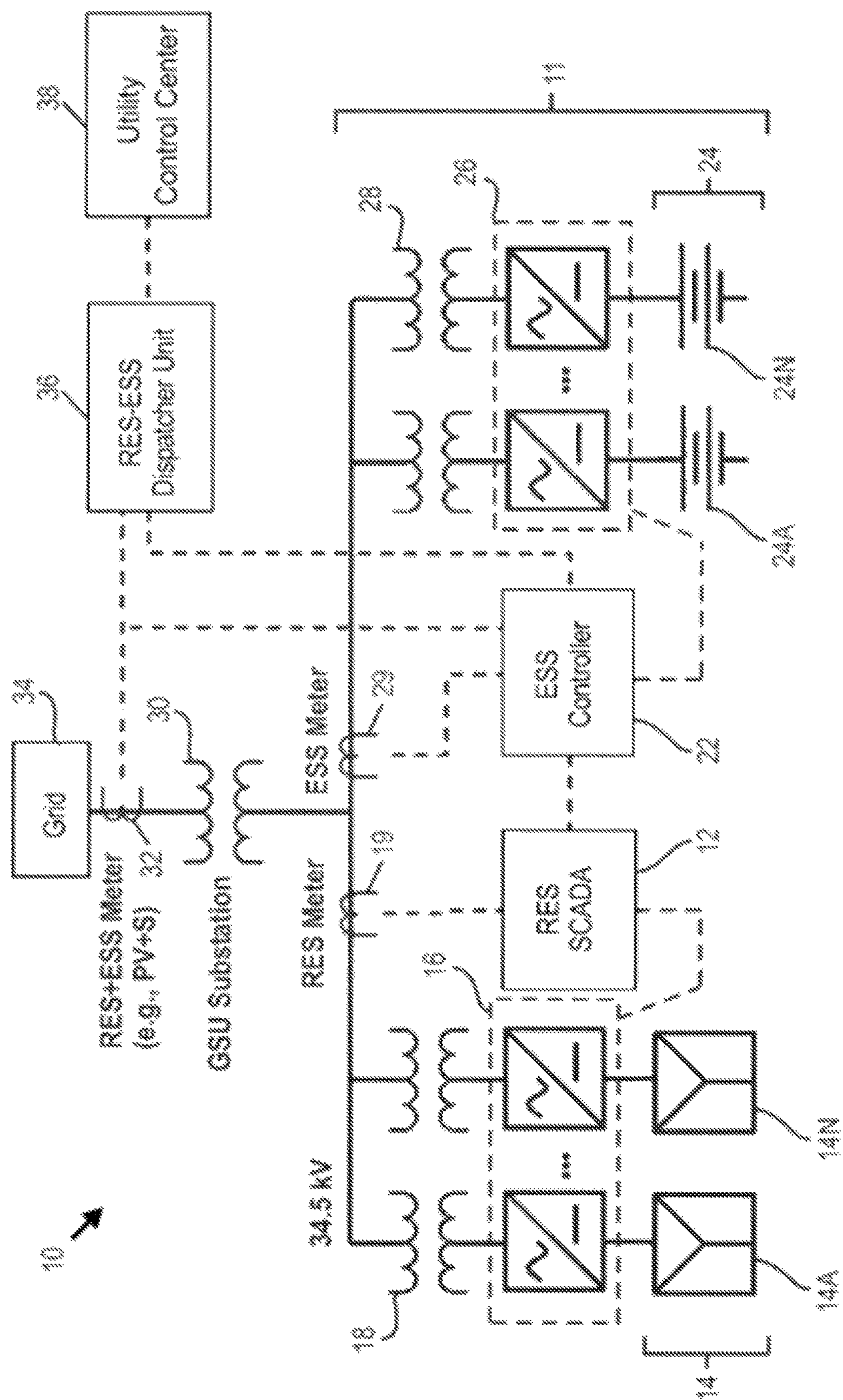
FIG. 1A is a schematic diagram of a renewable electrical energy generation device, according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A renewable energy source/energy storage system (RES-ESS) may include a renewable energy source (RES) configured to generate power from renewable sources (e.g., solar, wind, etc.) and an energy storage system (ESS), such as a battery bank, configured to store energy. The RES-ESS may be connected to a power grid, and both the RES and the ESS may supply power to the grid. The grid may also supply power to the ESS. The RES-ESS may also include behind-the-meter (BTM) load, such as an electrolysis plant configured to generate hydrogen from water by electrolysis using power from the RES, the ESS, or the grid. The BTM load may be connected to the RES and the ESS such that power from the RES in the ESS does not need to pass through the grid to reach the BTM load. RESs may have higher variations in power output compared to nonrenewable energy sources due to changes in weather, time of day, and time of year. For example, a solar RES may have a maximum power output during the middle of a sunny day in the summer, and may have lower power output at night, on cloudy days, and in the winter when the sun is lower in the sky. There may also be fluctuations in power demand from the grid. For example, power demands on the grid are commonly at their highest during the evening in the summer when grid customers are using air conditioning. Depending on these factors, it may be more efficient to supply power to the grid at certain times and to the BTM load and/or the ESS at other times. Accordingly, a solution is needed for controlling the flow of power between components in an RES-ESS system to prioritize delivering power to certain components over others at different times.

The systems and methods discussed herein may allow for the flow of power between components of a RES-ESS to be controlled according to a scheduled, chosen, or calculated prioritization. The prioritization may determine which power destinations (e.g., BTM loads, power grids, ESSs, etc.) will receive available power from power sources (e.g., RESs, ESSs, power grids, etc.). A higher priority power destination may receive available power up to a power limit of the higher priority power destination, and a lower priority power destination may receive any available power in excess of the power limit of higher priority power destination. The system may receive inputs for a prioritization mode and may control flow control components of the system to control the flow of power according to the prioritization mode. The prioritization modes may be chosen based on grid demand, weather, time of day, time of year, the state of charge of batteries in the ESS, demand from a BTM load, other factors affecting the production of power by the RES, physical limitations of the system components, and/or other considerations. For example, a BTM-ESS mode may be selected when grid demand is relatively low. In BTM-ESS mode, the system may prioritize supplying power to the BTM load over supplying power to the ESS or the grid and may prioritize supplying power to the ESS over supplying power to the grid. A Grid-ESS mode may be selected when grid demand is relatively high. In Grid-ESS mode, the system may prioritize supplying power to the grid over supplying power to the ESS or the BTM load and may prioritize supplying power to the ESS over supplying power to the BTM load. A Grid-BTM mode may be selected when demand from the grid and the BTM load are both relatively high. In Grid-BTM mode, the system may prioritize supplying power to the grid over supplying power to the ESS or the BTM load and may prioritize supplying power to the BTM load over supplying power to the ESS. A BTM-Grid mode may be selected when demand from the grid is relatively low, but still high enough to justify suppling power to the grid rather than storing it in the ESS. In BTM-Grid mode, the system may prioritize supplying power to the BTM load over supplying power to the ESS or the grid and may prioritize supplying power to the grid over supplying power to the ESS. Other control modes are possible, such as modes that prioritize supplying power to the ESS over supplying power to the grid and the BTM load. The systems and methods discussed herein may ensure that the RES-ESS system optimizes the use of the power generated by the RES to maximize efficiency and meet demands for power.

The systems discussed herein may include equipment configured to control the flow of power between the components of the system. The control equipment may include a controller communicably coupled to the RES, the ESS, the BTM load, and the grid. The controller may receive signals from these components indicating, for example, power demand from the grid and the BTM load, power output from the RES, and the state of charge of the ESS. The control equipment may also include flow control equipment, for example, inverters, voltage converters, and points of grid interconnection. The controller may send signals to the flow control equipment causing the flow control equipment to adjust their electrical characteristics, thereby controlling the flow of power in the system.

The systems and methods discussed herein may provide additional benefits over conventional systems in which loads are coupled to a RES or to a REPP including a RES and an ESS only via a power grid. For example, by including a load that is behind-the-meter (e.g., a BTM load) power can be supplied to the BTM load without being transmitted over the grid. This can reduce transmission losses that may occur from transmitting power over the grid, reducing energy waste and increasing efficiency. Further, because the BTM load is connected to the RES behind the meter, the systems can also ensure that power being delivered to the BTM load is entirely renewable power by not supplying power from the grid to the BTM load. When the BTM load is an electrolysis system, this may ensure that the hydrogen generated is "green" hydrogen, i.e., hydrogen generated entirely from renewable energy sources. In contrast, grid power is usually generated by a mixture of renewable and nonrenewable energy sources, such as coal and natural gas power plants that release carbon dioxide and other emissions. Operators of electrolysis plants powered by grid power generally cannot guarantee that the hydrogen produced is "green" and not generated by power production methods that release carbon dioxide. Green hydrogen may be particularly valuable to climate-conscious customers that want to reduce their carbon footprints.

The systems and methods discussed herein may further ensure that power is available to supply the BTM load regardless of grid capacity. If the grid is operating at or near its physical capacity, a grid connected load may not be able to receive power from a RES or any power at all. Because the BTM load is not connected to the RES via the grid, the BTM load can always receive power generated by the RES, even if the grid is already at full capacity. The systems and methods discussed herein may further reduce the need for non-renewable energy sources to serve grid demand by prioritizing the grid during high demand periods. For example, during high grid demand periods, grid operators may traditionally activate reserve power plants powered by nonrenewable fossil fuels (e.g., "peaker" plants). Peaker plants may release carbon dioxide and other emissions and may require significant amounts of energy to start up after being deactivated. The systems discussed herein may prioritize supplying power to a BTM load during most time periods but may switch operational modes to prioritize supplying power to the grid during high grid demand periods. Thus, rather than activating peaker plants to meet the elevated demand, the prioritization mode of the systems described herein can be switched to prioritize the grid over the BTM load. This may allow renewable energy to be supplied to the grid from the RES rather than nonrenewable power from a peaker plant and may avoid potential wasted energy needed to activate a previously deactivated peaker plant. The ESS may provide additional flexibility by allowing the system to provide power to the grid or the BTM load even when the RES is not producing power. The ESS can store power from the RES during high-RES power production periods and/or from the grid during low grid demand periods and can supply power when the RES cannot meet the demand from the BTM load and/or the grid. Thus, the systems are not limited to supplying power only during certain times of day or during certain weather conditions.

Referring now to FIG. 1A, a schematic diagram showing interconnections between various components of an AC coupled metering and control system 10 for controlling a renewable electrical energy generation device 14 (e.g., a REPP) including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a renewable energy source/energy storage system (RES-ESS) facility 11 is shown, according to one embodiment. It should be understood that the REPP 14 may include any number of generation units 14A-14N and any number of energy storage units 24A-24N, and the number of generation units 14A-14N may not be the same as the number of energy storage units 24A-24N. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert direct current (DC) power produced by a renewable electrical energy generation device 14 (e.g., a PV array in certain embodiments) or power released by the energy storage device 24 to alternating current (AC) power for coupling to an AC electrical grid 34. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., hydrogen storage vessels, adsorbent media for releasably binding hydrogen, and/or reversible chemical reactant vessels or beds), as well as equipment capable of generating electrical power using the stored hydrogen (e.g., fuel cells or gas turbines). In certain embodiments, an energy storage device 24 may include electrical charge storage devices such as batteries, optionally augmented with capacitors.

In certain embodiments, a RES-ESS dispatcher unit 36 can control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using Distributed Network Protocol 3 (DNP3) and set different configuration options. Additionally, the RES-ESS dispatcher unit 36 may receive or generate an accurate renewable generation forecast (e.g., solar generation forecast). Additionally, the RES-ESS dispatcher unit 36 may receive or generate an accurate forecast of station power requirements for the RES-ESS facility 11.

As shown in FIG. 1A, certain embodiments may utilize readily available electric power meters, such as a RES-ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
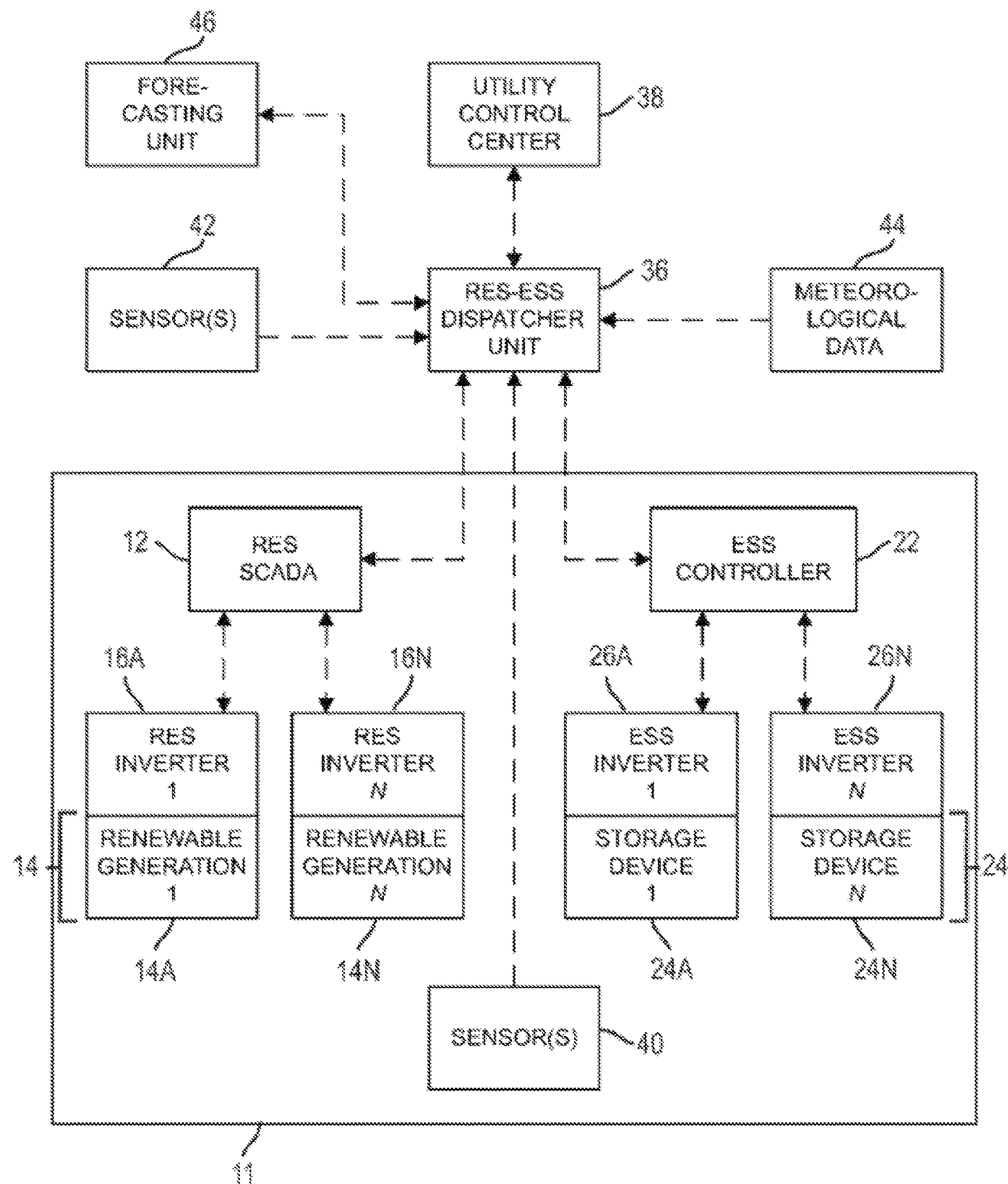
FIG. 1B is a schematic diagram showing certain components of the renewable energy source and energy storage system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). It should be understood that the REPP 14 may include any number of generation units 14A-14N and any number of inverter 16A-16N, and the number of generation units 14A-14N may not be the same as the number of inverters 16A-16N Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 further includes at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
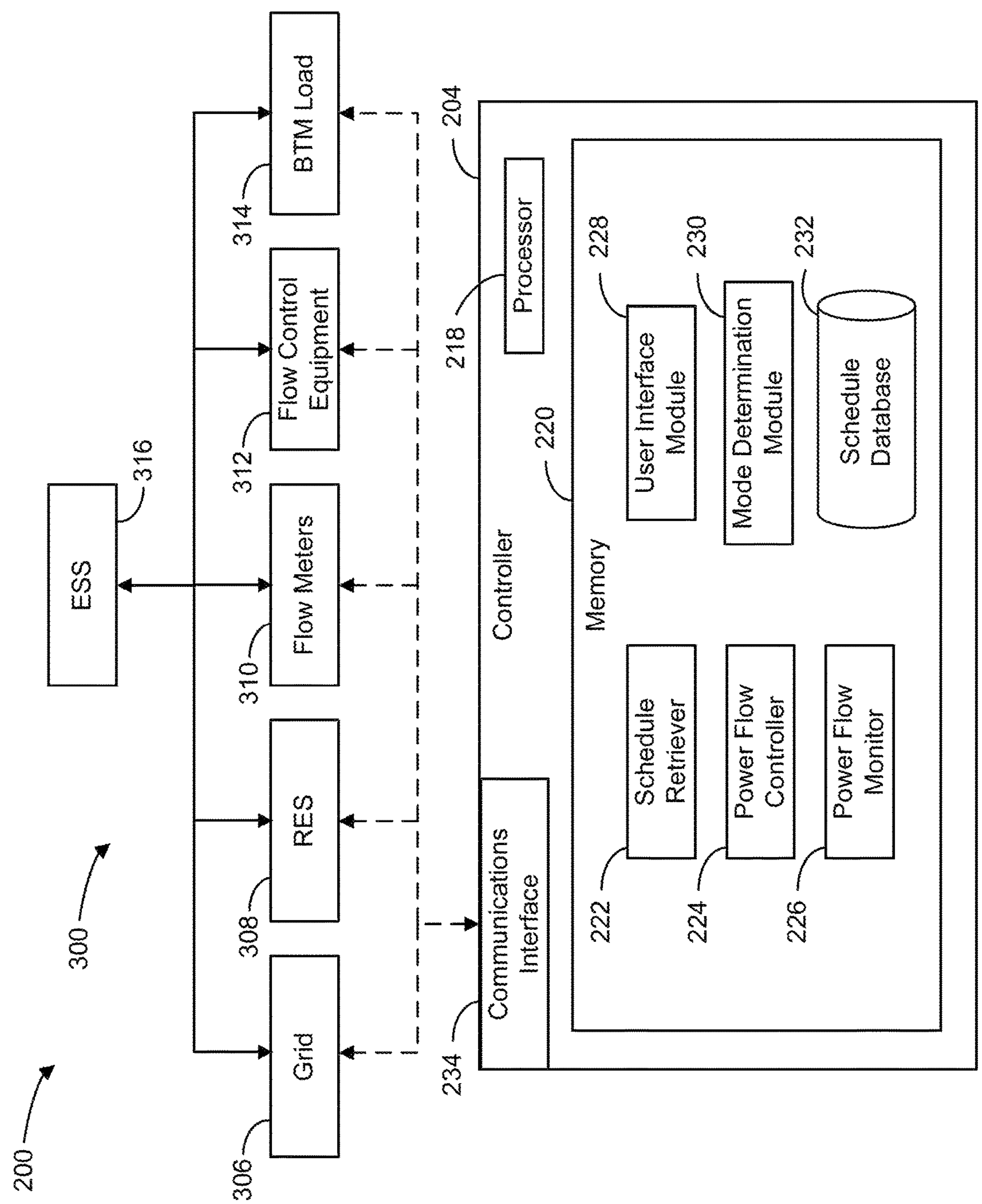
FIG. 2 illustrates a block diagram of an example system for controlling the flow of power in a renewable energy source and energy storage system, according to some embodiments.

Referring now to FIG. 2, a system 200 for controlling the flow of power in a RES-ESS 300 is shown, in accordance with some embodiments of the present disclosure. In brief overview, the system 200 can include a controller 204 that communicates with a power grid 306 (e.g., a utility grid operator controlling the power grid 306), an RES 308 (e.g., one or more solar panels or other types of renewable energy sources), flow meters 210, flow control equipment 312, and/or a BTM load 314 over a network. These components may operate together to control the flow of power between the grid 306, the RES 308, the BTM load 314, and the ESS 316 of the RES-ESS 300. For example, the ESS 316 may be charged via the grid 306 or the RES 308 or may discharge to the grid 306 or the BTM load 314 based on how the controller 204 controls the flow control equipment 312. The system 200 may include more, fewer, or different components than shown in FIG. 2. For example, there may be any number of client devices or computers that make up or are a part of the controller 204 or networks in the system 200. There may be additional equipment. For example, the system 200 may include more than one controller 204, and the RES-ESS 300 may include more than one RES 308, more than one grid 306, more than one ESS 316, and/or more than one BTM load 314. In some embodiments, the RES-ESS 300 may not include one or more of the ESS 316, the BTM load 314, the RES 308, or the grid 306. For example, the RES 308 may be coupled to an ESS 316 and two BTM loads 314 but may not be coupled to a grid 306, and the controller 204 may control determine the prioritization of the ESS 316 and the two BTM loads 314 and control the flow of power to each.

The controller 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The controller 204 can include or utilize at least one processing unit or other logic device such as a programmable logic array engine or a module configured to communicate with one another or other resources or databases. The components of the controller 204 can be separate components or a single component. The system 200 and its components can include hardware elements, such as one or more processors, logic devices, or circuits.

The controller 204 may comprise one or more processors 218 that are configured to control the flow of power in the RES-ESS 300. The controller 204 may comprise a communications interface 234, a processor 218, and/or memory 220. The controller 204 may communicate with the RES 308 (or devices controlling the RES 308), the grid 306 (or devices controlling the grid 306), the flow meters 210 (or devices controlling the flow meters 210), the flow control equipment 312 (or devices controlling flow control equipment 312) and/or the BTM load 314 (or devices controlling the BTM load 314) via the communications interface 234. The processor 218 may be or include an ASIC, one or more FPGAs, a DSP, circuits containing one or more processing components, circuitry for supporting a microprocessor, a group of processing components, or other suitable electronic processing components. In some embodiments, the processor 218 may execute computer code or modules (e.g., executable code, object code, source code, script code, machine code, etc.) stored in the memory 220 to facilitate the activities described herein. The memory 220 may be any volatile or non-volatile computer-readable storage medium capable of storing data or computer code.

The memory 216 may include a schedule retriever 222, and power flow controller 224, a power flow monitor 226, a user interface module 228, and a schedule database 232. In brief overview, the components 222-232 may cooperate to control the flow of power between components of the RES-ESS 300 (e.g., the grid 306, the RES 308, the BTM load 314, and the ESS 316). The components 222-232 may receive instructions to deliver power from the RES 308 and/or the grid 306 to the ESS 316 and/or the BTM load 314 or from the RES 308 and/or the ESS 316 to the BTM load 314 and/or the grid 306. The components 222-232 may then operate the flow control equipment 312 to adjust the flow of power between the grid 306, the RES 308, the BTM load 314, and the ESS 316.

The schedule retriever 222 may comprise programmable instructions that, upon execution, cause processor 218 to retrieve a flow control schedule for the RES-ESS from the schedule database 232. For example, the schedule retriever 222 may retrieve a prioritization schedule from the schedule database 232. The prioritization schedule may be a data file including a schedule for a defined time period (e.g., an hour, a day, a week, a month, etc.) indicating which loads should be prioritized in the RES-ESS during which time periods (e.g., smaller time periods or time frames having beginning times and end times within the time period of the schedule). For example, the prioritization schedule may indicate that providing power to an ESS is a higher priority than providing power to a behind-the meter (BTM) load or a power grid. The schedule retriever 222 may retrieve the prioritization schedule from the schedule database 232 (e.g., a relational database) based on the time period of the prioritization schedule. For example, the schedule database 232 may store multiple prioritization schedules for future time periods. Each prioritization schedule may include time stamps indicating the beginning and/or the end of the time period of the respective prioritization schedule. The schedule retriever 222 may identify the beginning time (and/or date) of each schedule and retrieve the schedule with a beginning time closest to the current time. In some embodiments, the prioritization schedules may be sequentially numbered and the schedule retriever 222 may identify and retrieve the prioritization schedule with the lowest (or highest depending on the configuration) sequential value in the schedule database 232, in some cases subsequent to a previously retrieved schedule. The schedule retriever 222 may query the schedule database 232 at regular intervals to determine the prioritization until the next interval. For example, the schedule retriever 222 may query the schedule database 232 every minute to determine which loads to prioritize for the next minute.

The power flow controller 224 may comprise programmable instructions that, upon execution, cause processor 218 to transmit control signals or otherwise control the flow of power to and/or from the equipment of the RES-ESS (e.g., the power grid 306, the RES 308, the ESS 316, and/or the BTM load 314. The power flow controller 224 may send control signals to the flow control equipment 312 to control the flow of power in the system. The control signals may be based on the prioritization schedule retrieved by the schedule retriever 222 from the schedule database 232. The flow control equipment 312 may include inverters, transformers, DC-DC converters, and other equipment configured to control the flow into and out of the power grid 306, the RES 308, the ESS 316, and/or the BTM load 314. For example, a RES inverter may be positioned between the RES 308 and the other components in the RES-ESS to convert direct current (DC) power from the RES 308 to alternating current (AC) power. A high-voltage transformer may be positioned between the grid 306 and the other components of the RES-ESS to convert the AC power to high voltage AC power for distribution to the grid 306. The high-voltage transformer may also convert high-voltage power from the grid to lower voltage power for use in by ESS 316 and/or the BTM load 314. An ESS inverter by be positioned between the ESS 316 and the other components to convert power from the RES inverter or the high-voltage transformer to DC power for storage in the ESS. The ESS inverter may also convert the DC power from the ESS to AC power for delivery to the grid 306 via the high-voltage transformer. A BTM inverter may be positioned between the BTM load 314 and the other RES-ESS components to convert AC power from the RES inverter, the ESS inverter, or the high-voltage transformer to DC power to supply power to the BTM load 314.

The power flow controller 224 may send signals to these flow control equipment 312 devices to adjust the flow of power in the RES-ESS. The power flow controller 224 may comprise programmable instructions that, upon execution, cause processor 218 to send signals, via the communications interface 234, to the various pieces of flow control equipment 312 to increase or decrease the voltage at different locations in the RES-ESS. Because current in a circuit flows from high voltage to low voltage, the direction of power flow can be controlled by adjusting the voltage at the various pieces of flow control equipment 312. For example, the power flow controller 224 may cause the magnitude of the voltage at the RES inverter to be higher than the magnitude of the voltage in the ESS inverter, causing power to flow from RES 308 to the ESS 316.

The power flow monitor 226 may comprise programmable instructions that, upon execution, cause processor 218 to receive power flow data from the flow meters 210. The flow meters 210 may measure the flow of energy through the system and may also include state of charge (SOC) meters configured to measure the SOC of the ESS 316. Data from the flow meters 210 may enable the power flow monitor 226 to determine how much energy is flowing into and out of the various components of the RES-ESS to confirm that the prioritization is successful.

The user interface module 228 may generate user interfaces for and receive commands from a user terminal of the RES-ESS 300. For example, the user interface module 228 may generate a user interface that indicates the measurements from the flow meters 210, information regarding the demand from the grid 306 and the BTM load 314, and other information regarding the RES-ESS 300. The user interface module 228 may also generate a user interface that allows a user to select a prioritization mode for the RES-ESS 300. The user selection may override the prioritization mode determined by the schedule retriever 222. For example, if the scheduled prioritization retrieved by the schedule retriever 222 does not reflect a sufficient prioritization, user may adjust the prioritization using a user interface generated by the user interface module 228.

The mode determination module 230 may determine the most efficient prioritization mode based on various data. The mode determination module 230 may override the scheduled prioritization mode retrieved by the schedule retriever 222 when a more efficient mode is available under current or future conditions. For example, the mode determination module 230 may receive information via the communications interface 234 regarding current and expected weather conditions, current and expected power demand from the grid 306 and BTM load 314, the time of day, the time of year, etc. The mode determination module 230 may determine, based on this information the most efficient prioritization mode. For example, if the scheduled prioritization mode prioritizes supplying power to the grid, and the mode determination module 230 receives a message indicating a high demand for power from the BTM load, the mode determination module 230 may override the scheduled prioritization mode and switch the system to a prioritization mode that prioritizes the BTM load.

Figure 3:
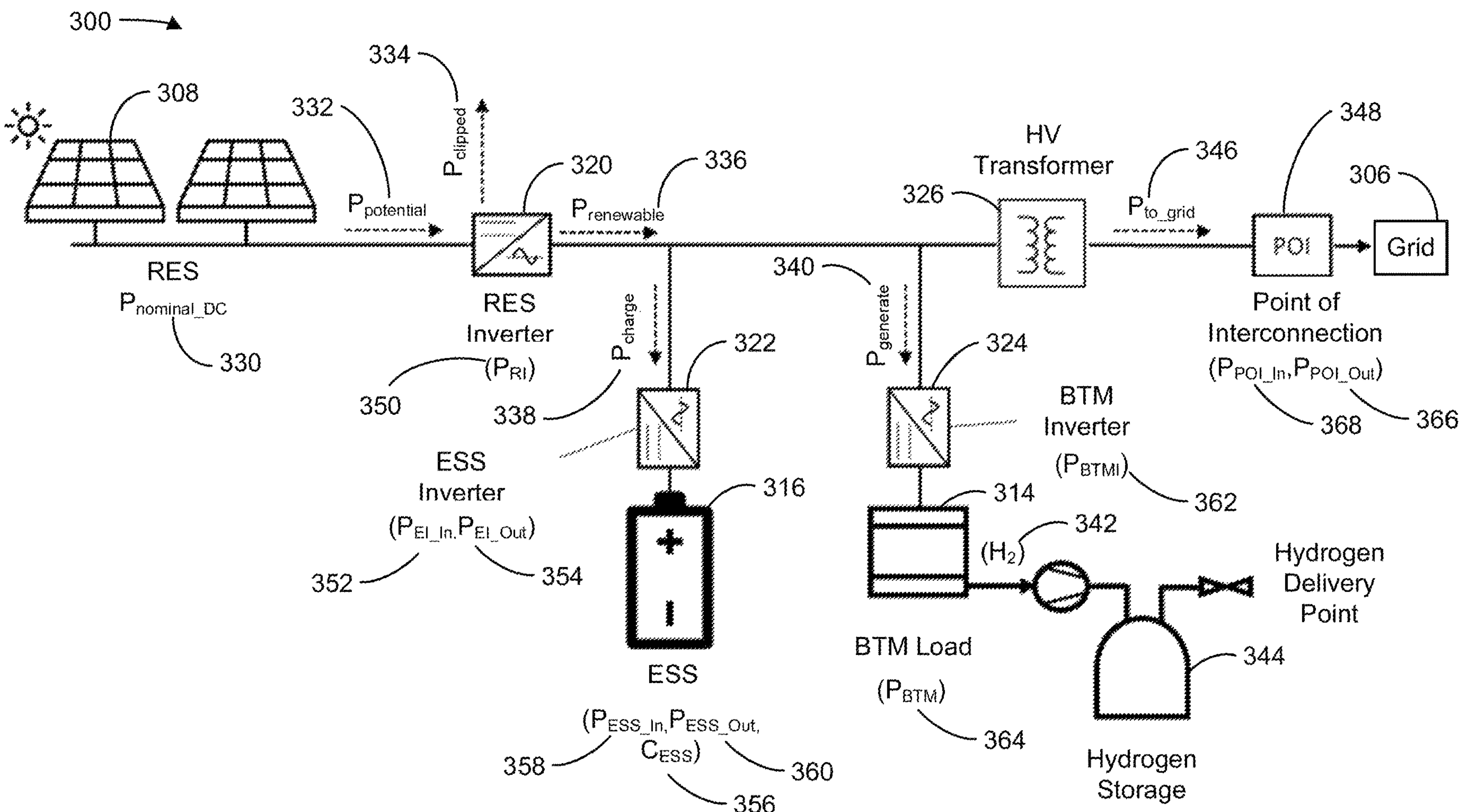
FIG. 3 illustrates a renewable energy source and energy storage system, according to some embodiments.

Referring now to FIG. 3, a diagram of a RES-ESS 300 is shown, according to some embodiments. The flow of power in the RES-ESS 300 may be controlled by the controller 204 of the control system 200. The RES-ESS 300 includes the RES 308, which is configured to generate power from renewable sources. The power generated by the RES 308 may be delivered to the ESS 316, which can store the power for later delivery to the grid 306 or to the BTM load 314, to the BTM load 314, or to the grid 306. The grid 306 can also supply power to the ESS 316 and the BTM load 314. The grid 306 may be coupled to the RES-ESS 300 via a point of interconnection (POI) 348), which can control or limit the flow of power between the grid 306 and the RES-ESS 300. The grid 306 may be coupled to additional loads (e.g., homes, businesses, etc.) as well as additional energy sources and/or power plants remote from RES-ESS 300. For example, the grid 306 may be coupled to a remote wind power plant and may supply energy generated by the remote wind power plant to the RES for use by the BTM load 314 or for storage in the ESS 316. The remote wind power plant may connect to the grid 306 and the RES-ESS 300 via the same point of interconnection as the RES-ESS 300 (e.g., POI 348) or may connect to the grid 306 via remote point of interconnection. The power flow controller 224 of the controller 204 can control the flow control equipment 312 (e.g., the inverters 320-324, the transformer 326, the POI 348 etc.) to control the flow of power between the grid 306, the RES 308, the ESS 316, and the BTM load 314.

The RES 308 may be or may include a solar power plant, a wind turbine power plant, a geothermal power plant, a hydroelectric power plant, or other renewable power plants. In the example embodiment shown in FIG. 3, the RES 308 includes a solar panel array. The RES 308 may have a maximum nominal power output 330 (denoted as $P_{nominal\_DC}$ in FIG. 3) representing the amount of power that the RES can produce under ideal conditions. Because of fluctuations in available sunlight due to weather conditions and the time of day, as well as other factors including the age of the solar panels and, the power output from the RES 308 may be limited to an actual DC RES power output 332 (denoted as $P_{potential}$ in FIG. 3). The actual DC RES power output 332 may vary based on the time of day, the time of year, the weather, etc. The actual DC RES power output 332 may be directed to the RES inverter 320, which converts the DC power output of the RES 308 to AC power. In some cases, such as when the RES is or includes one or more wind turbines, the power generated by the RES may be AC power. In that case, the system 300 may include one or more rectifiers to convert the generated power to DC power before it is directed to the RES inverter 320 to be converted back to AC power at the proper frequency and phase for the system 300. The RES power output 332 may be clipped (e.g., curtailed, reduced, etc.) by the RES inverter 320 to limit the amount of power that is delivered by the RES 308. Clipping the RES power output 332 may be achieved by dissipating the energy, for example in a resistive load, by altering the electrical characteristics of the RES inverter's 320 electrical inputs, or by any other suitable method resulting in a limitation of the power produced by the RES 308. The RES power output 332 may thus be split into an amount of clipped power 334 (denoted as $P_{clipped}$ in FIG. 3) in an amount of renewable AC power 336 (denoted as $P_{renewable}$ in FIG. 3). The clipped power 334 is dissipated or otherwise not delivered to the other components of the system 300, while the renewable AC power 336 may then be delivered to other components of the system 300 (e.g., ESS 316, the BTM load 314, and/or grid 306, etc.).

All or a portion of the renewable AC power 336 may be directed to the ESS 316 via the ESS inverter 322. In some embodiments, the ESS 316 may be a battery or battery bank (e.g., a lithium-ion battery bank, a lead acid battery bank, etc.) configured to store DC power. The AC power directed to the ESS 316 (denoted as $P_{charge}$ in FIG. 3) may be referred to as the charge power 338. The ESS inverter 322 converts the AC charge power 338 to DC power for storage in the ESS 316. Depending on the time of day, time of year, and other factors, it may be more efficient to supply power to the ESS 316 during low demand periods for later delivery to the grid 306 during high power demand periods. The ESS inverter 322 may control and limit the power flowing into the ESS 316, either due to the physical limitations of the ESS inverter 322 or based on control signals received by the ESS inverter 322 from the controller 204.

All or a portion of the renewable AC power 336 may be directed to the BTM load 314 via the BTM inverter 324. The AC BTM power 340 (denoted as $P_{generate}$ in FIG. 3) may be converted by the BTM inverter 324 to DC power for delivery to the BTM load 314. The BTM inverter 324 may control and limit the power flowing into the BTM load 314, either due to the physical limitations of the BTM inverter 324 or based on control signals received by the BTM inverter 324 from the controller 204. The BTM load 314 is shown in FIG. 3 as an electrolyzer configured to generate hydrogen from water. The BTM power 340 is supplied to a circuit that causes water molecules to be split into oxygen gas molecules and hydrogen gas molecules using an electrochemical cell. The hydrogen gas 342 may be pressurized and stored in a hydrogen storage tank 344 for later use in power production (e.g., using fuel cells) or other industrial processes. Hydrogen produced using power from an RES (e.g., RES 308) may be referred to as "green" hydrogen, as it is produced without the emission or production of carbon dioxide. Thus, when the BTM load 314 is an electrolyzer, the BTM load 314 can function as another clean energy storage solution when demand from the grid 306 is relatively low. It should be understood, however, that the BTM load 314 may be or may include other types of loads including metal smelting loads, cryptocurrency mining loads, "vertical" farming loads, water purification loads, glass production loads, or any other type of electrical load. Depending on the type of load, an AC-AC transformer may be used, instead of a BTM inverter 324, to adjust the voltage of the AC BTM power 340 before it is delivered to the BTM load 314 as AC power. Because the BTM load 314 is "behind-the meter," power may be supplied directly from the RES 308 to the BTM load 314 without being transmitted over the grid 306. For processes that consume large amounts of energy, there may, at times, not be sufficient electrical grid capacity to transport or transmit the energy required to the energy-consuming process. Further, transmission of power over the grid 306 may result in transmission losses that may reduce the efficiency of the system 300.

Any renewable AC power 336 that is not delivered to the ESS 316 or the BTM load 314 may be delivered to the grid 306. The power may first be delivered to a high-voltage AC-AC transformer 326 which converts the renewable AC power 336 to high-voltage AC grid power 346 (denoted as $P_{to\_grid}$ in FIG. 3) for transmission over the grid 306. The grid 306 may be connected to the rest of the RES-ESS 300 via the POI 348.

Depending on various conditions, including the time of day, time of year, weather, expected weather, etc., the controller 204 may operate the flow control equipment 312 (e.g., the RES inverter 320, the ESS inverter 322, the BTM inverter 324, the high-voltage transformer 326, the POI 348, etc.) to prioritize the flow of power to one or more of the ESS 316, the BTM load 314, or the grid 306. For example, during periods of low demand from the grid 306, the controller 204 may operate the flow control equipment 312 to supply available power from the RES 308 and the ESS 316 to the BTM load 314 before power is supplied to the grid 306. Supplying power to a first destination "before" power is supplied to a second destination may refer to the controller 204 operating to cause available power to be sent to the first destination, up to the power limit of first destination, with any power in excess of the power limit of the first destination being directed to the second destination. Thus, during periods of low demand from the grid 306, the controller 204 may operate to cause all available power from the RES 304 and the ESS 316 to be sent to the BTM load 314, up to the power limit of the BTM load 314, with any power in excess of the power limit of the BTM load 314 being directed to the grid. If the RES 308 produces more power than a power limit of the BTM load 314, the excess power may be supplied to the ESS 316 before power is supplied to the grid 306. During periods of high demand from the grid 306, the controller 204 may operate the flow control equipment 312 to supply available power to the grid 306 before power is supplied to the ESS 316 or the BTM load 314.

The amount of power supplied to or from each component may be limited based on physical limitations of the components of the system 300 or based on control parameters provided to the flow control equipment by the controller 204. For example, the RES inverter power limit 350 (denoted as PRI in FIG. 3) may limit the amount of the DC RES power output 332 that can be converted into renewable AC power 336. The maximum RES inverter power limit 350 may be determined by the physical capacity of the RES inverter 320 to convert the DC RES power 332, and the controller 204 may further lower the RES inverter power limit 350 as necessary. As discussed above, the remaining power may be clipped and removed from the system 300 as the clipped power 334.

The ESS inverter power-in limit 352 (denoted as $P_{EI\_In}$ in FIG. 3) may limit the amount of the renewable AC power 336 that can be converted to DC power by the ESS inverter 322. The ESS inverter power-out limit 354 (denoted as $P_{EI\_Out}$ in FIG. 3) may limit the amount of the DC power stored in the ESS 316 that can be converted back to AC power by the ESS inverter 322. These limits 352, 354 may be determined by the physical capacity of the RES inverter 320 to convert power from DC to AC and vice versa, and the controller 204 may further lower the limits 352, 354 as necessary and according to the determined prioritization. The ESS 316 may also be physically limited in its maximum storage capacity 356, its maximum charge rate 358, and its maximum discharge rate 360 (denoted respectively as $C_{ESS}$, $P_{ESS\_In}$, and $P_{ESS\_Out}$ in FIG. 3). The greater of the maximum charge rate 358 and the ESS inverter power-in limit 352 may determine the charge power 338 delivered to the ESS 316. When the ESS 316 is a battery bank, the maximum discharge rate 360 may vary based on the state of charge (SOC) of the batteries. For example, the maximum discharge rate 360 may be lower at lower SOCs.

The BTM inverter power limit 362 (denoted as $P_{BTMI}$ in FIG. 3) may limit the amount of the renewable AC power 336 that can be converted to DC power by the BTM inverter 324. The BTM inverter power limit 362 may be determined by the physical capacity of the BTM inverter 324 to convert power from AC to DC, and the controller 204 may further lower the BTM inverter power limit 362 as necessary and according to the determined prioritization. The BTM load 314 may also be physically limited by a BTM power limit 364 (denoted as $P_{BTM}$ in FIG. 3) corresponding to the amount of power needed by the BTM load 314. For example, if the BTM load 314 is a glass production facility, the BTM power limit 364 may correspond to the volume of glass the facility is scheduled to produce in a given time period. Where the BTM load 314 is an electrolyzer, the BTM power limit 364 may correspond to the maximum rate of electrolysis of the electrolyzer, which may be fixed, or in some cases may fluctuate based on temperature. The greater of the BTM inverter power limit 362 and the BTM power limit 364 may determine the maximum BTM power 340 delivered to the BTM load 314.

The POI inverter power-out limit 366 (denoted as $P_{POI\_Out}$ in FIG. 3) may limit the amount of the high voltage AC grid power 346 that is delivered by the POI 348 to the grid 306. The POI inverter power-in limit 368 (denoted as $P_{POI\_In}$ in FIG. 3) may limit the amount of power delivered from the grid 306 to the high-voltage transformer 326 and other components of the RES-ESS 300. These limits 366, 368 may be determined by the physical capacity of the POI 348 to transmit power, and the controller 204 may further lower the limits 366, 368 as necessary and according to the determined prioritization. The limits 366, 368 may not necessarily be the same.

The controller 204 may send instructions to the flow control equipment 312 (e.g., the RES inverter 320, the ESS inverter 322, the BTM inverter 324, the high-voltage transformer 326, the POI 348, etc.) to direct the flow of power in the system 300. For example, the controller 204 may instruct the ESS inverter 322 to control whether and how much power flows into or out of the ESS 316. The controller 204 may instruct the BTM inverter 324 to control whether and how much power flows into the BTM load 314. The controller 204 may instruct the RES inverter 320 to control how much power generated by the RES 308 is delivered to the components of system 300 and how much is clipped. And the controller 204 may instruct the POI 348 and/or the high-voltage transformer 326 to control whether and how much power is supplied to or from the grid 306.

Figure 4:
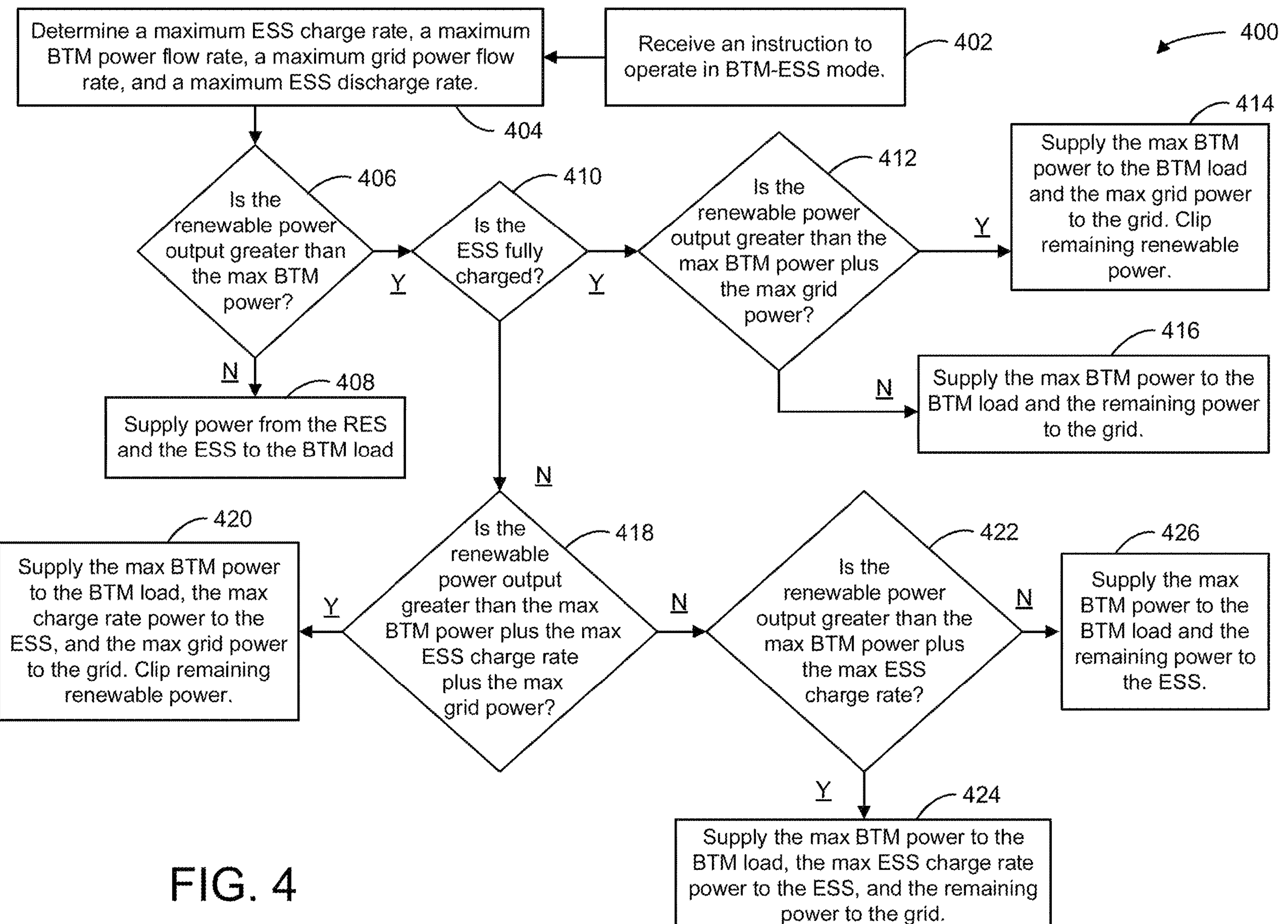
FIG. 4-7 illustrate flowcharts of example methods for controlling a renewable energy source and energy storage system, according to some embodiments.

FIG. 4 illustrates a method 400 for controlling the flow of electricity in a RES-ESS to prioritize supplying power to a BTM load, according to some embodiments. The method 400 can be performed by a processing circuit (e.g., a controller, a computer, the controller 204, the RES SCADA controller 12, etc.). In some embodiments, the processing circuit is the controller of a renewable energy plant that contains a RES configured to supply power to an ESS, to a BTM load, and to a grid. For example, the processing circuit may be the controller 204 that is configured to control the RES-ESS 300. The processing circuit may control equipment that operates to control the flow of electricity in the renewable energy plant. The processing circuit may control the flow of power such that supplying power to the BTM load and the ESS is prioritized over supplying power to the grid. The method 400 may preferably be executed when there is relatively low demand on the grid, such as during the middle of the day and late at night. The method 400 may include more or fewer operations, and the operations may be performed in any order, except where specified.

At operation 402 of the method 400, the processing circuit receives an instruction to operate in BTM-ESS mode. In BTM-ESS mode, supplying power from the RES to the BTM load is prioritized over supplying power to the ESS and the grid, and supplying power from the RES to the ESS is prioritized over supplying power to the grid. Referring to the RES-ESS 300, power from the RES 308 may preferably be supplied to the BTM load 314 before power is supplied to the ESS 316, and power may preferably be supplied to the ESS 316 before power is supplied to the grid 306.

At operation 404 of the method 400, the processing circuit may determine a maximum power level for several components of the RES-ESS. The maximum power levels may include a maximum ESS charge rate, a maximum BTM input power level, a maximum grid input power level, and a maximum ESS discharge rate. The maximum grid input level may refer to the maximum power that can be received by the grid and may be equal to the POI inverter power-out limit 366 ($P_{POI\_out}$).

At operation 406 of the method 400, the processing circuit determines whether the renewable power output is greater than the maximum BTM input power level. If the renewable power output is greater than the maximum BTM input power level, the RES may supply the maximum BTM input power level to the BTM load with additional power remaining. If the renewable power output is not greater than the maximum BTM input power level, additional power may be supplied to the BTM load from the ESS or the grid, if necessary.

If it is determined at operation 406 that the renewable power output is less than the maximum BTM power, the method 400 may proceed to operation 408. At operation 408, all of the power from the RES plus additional power from the ESS is supplied to the BTM load. The amount of power supplied from the ESS to the BTM load may be equal to the maximum BTM input power level minus the renewable power, such that the BTM load receives a maximum BTM input power level. If the renewable power output plus the maximum ESS power output is less than the maximum BTM input power level, or if the ESS has insufficient charge, the BTM load may receive less than the maximum BTM input power level. In some embodiments, at operation 408, power from the grid may be supplied to the BTM load in addition to the power from the RES and the ESS. In some embodiments, at operation 408, power may be supplied from the grid to the BTM load and/or the ESS instead of from the ESS to the BTM load.

Referring to the RES-ESS 300 of FIG. 3, at operation 408, the controller 204 may instruct the flow control equipment 312 to cause the RES 308 to supply all of the renewable power output 336 to the BTM load 314 via the RES inverter 320 and the BTM inverter 324. The controller 204 may then determine the difference between the power supplied to the BTM load by the RES 308 (e.g., all of the renewable power output 336) and the maximum BTM power 340 and instruct the ESS 316 to supply the determined amount of power to the BTM load 314 via the ESS inverter 322 and the BTM inverter 324. If the ESS 316 is unable to supply the determined amount of power, the ESS 316 may supply the lesser of the ESS inverter power-out limit 354 or the ESS maximum discharge rate 360. In some embodiments, power may be provided from the grid to the RES in addition to the power from the ESS and the RES If the ESS 316 has insufficient charge to supply power, the BTM load may receive only the renewable power output 336. In some embodiments, if the ESS 316 has insufficient charge, power may be supplied from the RES 308 and the grid 306 to the BTM load 314. In some embodiments, power may be supplied to both the ESS 316 and the BTM load 314 from the grid 306 rather than supplying power from the ESS 316 to the BTM load 314.

If it is determined at operation 406 that the renewable power output is greater than the maximum BTM power, the method 400 may proceed to operation 410. At operation 410, the processing circuit determines whether the ESS is fully charged. If the ESS is fully charged, no power may be delivered to the ESS, and any excess power can be delivered to the grid or clipped.

If it is determined at operation 410 that the ESS is fully charged, the method 400 may proceed to operation 412. At operation 412, processing circuit may determine whether the renewable power output is greater than the maximum BTM input power level plus the maximum grid input power level. If the renewable power output is greater than the maximum BTM input power level plus the maximum grid input power level, and the ESS is fully charged, the excess power may be clipped at a RES inverter. If the renewable power output is not greater than the maximum BTM input power level plus the maximum grid input power level, the maximum BTM input power level may be supplied to the BTM load, and the remaining power may be supplied to the grid.

If it is determined at operation 412 that the renewable power output is greater than the maximum BTM input power level plus the maximum grid power level, the method 400 may proceed to operation 414. At operation 414, the maximum BTM power is supplied to the BTM load, and the maximum grid input power is supplied to the grid. Because, as determined in operation 410, there is no available storage capacity in the ESS, and because both the BTM load and the grid are receiving their respective maximum power levels, the RES is producing more power than can be allocated to the components of the RES-ESS. Thus, the excess power may be clipped at an RES inverter.

Referring to the RES-ESS 300 of FIG. 3, at operation 414, the controller 204 may instruct the flow control equipment 312 to cause the maximum BTM power 340 to flow to the BTM load 314 from the RES 308, via the RES inverter 320 and the BTM inverter 324, and the maximum grid input power 346 to flow to the grid 306 from the RES 308, via the RES inverter 320 and the POI 348. The controller 204 may then calculate the difference between the renewable power output 336 and the total amount of power supplied to the BTM load 314 and the grid 306 to determine the excess power output of the RES 308. Because it was determined at operation 410 that the ESS 316 is fully charged, and the grid 306 and BTM load 314 are each receiving their respective maximum amounts of power, this excess power may not be able to be supplied to any of the loads in the system 300. The controller 204 may instruct the RES inverter 320 to clip the excess power and treat it as clipped power 334.

If it is determined at operation 412 that the renewable power output is not greater than the maximum BTM input power level plus the maximum grid power level, the method 400 may proceed to operation 416. At operation 416, the maximum BTM power is supplied to the BTM load, and the remaining power is supplied to the grid. Because, as determined in operation 410, there is no available storage capacity in the ESS, power is instead supplied to the grid, despite the preference for supplying power to the ESS. Referring to the RES-ESS 300 of FIG. 3, at operation 416, the controller 204 may instruct the flow control equipment 312 to cause the maximum BTM power 340 to flow to the BTM load 314 from the RES 308, via the RES inverter 320 and the BTM inverter 324, and the remaining power to flow to the grid 306 from the RES 308, via the RES inverter 320 and the POI 348.

If it is determined at operation 410 that the ESS is not fully charged, the method 400 may proceed to operation 418. At operation 418, the processing circuit determines whether the renewable power output is greater than the maximum BTM input power level plus the maximum ESS charge rate plus the maximum grid input power level. If it is determined that the renewable power output is greater than the combined input power levels, the remaining power may be clipped at a RES inverter. If it is determined that the renewable power output is less than the combined input power levels, power may be supplied to the BTM load and the ESS, and, if additional power remains, to the grid.

If it is determined at operation 418 that the renewable power output is greater than the maximum BTM input power level plus the maximum ESS charge rate plus the maximum grid input power level, the method 400 may proceed to operation 420. At operation 420, power is supplied to the BTM load at the maximum BTM input power level, power is supplied to the ESS at the maximum charge rate, and power is supplied to the grid at the maximum grid input power level. The excess power produced by the RES may be clipped at a RES inverter. Referring to the RES-ESS 300 of FIG. 3, at operation 418, the controller 204 may determine that the renewable power output 336 exceeds the combined maximum input power levels of the ESS 316, the BTM load 314, and the grid 306. At operation 420, the controller 204 may instruct the flow control equipment 312 to cause the maximum BTM power 340 to flow to the BTM load 314 from the RES 308, via the RES inverter 320 and the BTM inverter 324, power to flow to the ESS 316 at the maximum charge rate 358, via the RES inverter 320 and the ESS inverter 322, and the maximum grid input power 346 to flow to the grid 306 from the RES 308, via the RES inverter 320 and the POI 348. Because all of the loads in the system 300 are receiving power at their respective maximum capacities, controller 204 may instruct the RES inverter 320 to clip the excess power and treat it as clipped power 334.

If it is determined at operation 418 that the renewable power output is not greater than the maximum BTM input power level plus the maximum ESS charge rate plus the maximum grid input power level, the method 400 may proceed to operation 422. At operation 422, the processing circuit determines whether the renewable power output is greater than the maximum BTM input power level plus the maximum ESS charge rate. If the renewable power output is greater than the maximum BTM input power level plus the maximum ESS charge rate, the remaining power may be supplied to the grid. If the renewable power output is not greater than the maximum BTM input power level plus the maximum ESS charge rate, the maximum BTM input power level may be supplied to the BTM load, and the remaining power may be supplied to the ESS.

If it is determined at operation 422 that the renewable power output is greater than the maximum BTM input power level plus the maximum ESS charge rate, the method 400 may proceed to operation 424. At operation 424, power may be supplied to the BTM load at the maximum BTM input power level, and power may be supplied to ESS at the maximum ESS charge rate. The remaining power may be supplied to the grid.

If it is determined at operation 422 that the renewable power output is not greater than the maximum BTM input power level plus the maximum ESS charge rate, the method 400 may proceed to operation 426. At operation 426, power may be supplied to the BTM load at the maximum BTM input power level, and the remaining power may be supplied to the ESS. In some embodiments, at operation 426, power may also be supplied to the ESS from the grid.

Referring to the RES-ESS 300 of FIG. 3, at operation 422, the controller 204 may determine that the renewable power output 336 exceeds the combined maximum input power levels of the BTM load 314 and the ESS 316. At operation 424, the controller 204 may instruct the flow control equipment 312 to cause the maximum BTM power 340 to flow to the BTM load 314 from the RES 308, via the RES inverter 320 and the BTM inverter 324, and power to flow to the ESS 316 from the RES 308 at the maximum charge rate 358, via the RES inverter 320 and the ESS inverter 322. The controller 204 may then instruct the flow control equipment 312 to cause remaining power to flow to the grid 306 from the RES 308, via the RES inverter 320 and the POI 348. If the controller 204 determines, at operation 422, that the renewable power output 336 does not exceed the combined maximum input power levels of the BTM load 314 and the ESS 316, the controller 204, at operation 426, may instruct the flow control equipment 312 to cause the maximum BTM power 340 to flow to the BTM load 314 from the RES 308, via the RES inverter 320 and the BTM inverter 324, and the remaining power to flow to the ESS 316 from the RES 308, via the RES inverter 320 and the ESS inverter 322. No power may be supplied to the grid 306 because supplying power to the BTM load 314 and ESS 316 is prioritized over supplying power to the grid 306 in the BTM-ESS mode. The grid 306 may supply power to the ESS 316 at operation 426 to charge the ESS 316.

The method 400 may ensure that, in BTM-ESS mode, available power generated by the RES is first supplied to the BTM load, and the remaining power is supplied to the ESS. Power may only be supplied to the grid when no additional power can be supplied to the BTM load and the ESS.

Figure 5:
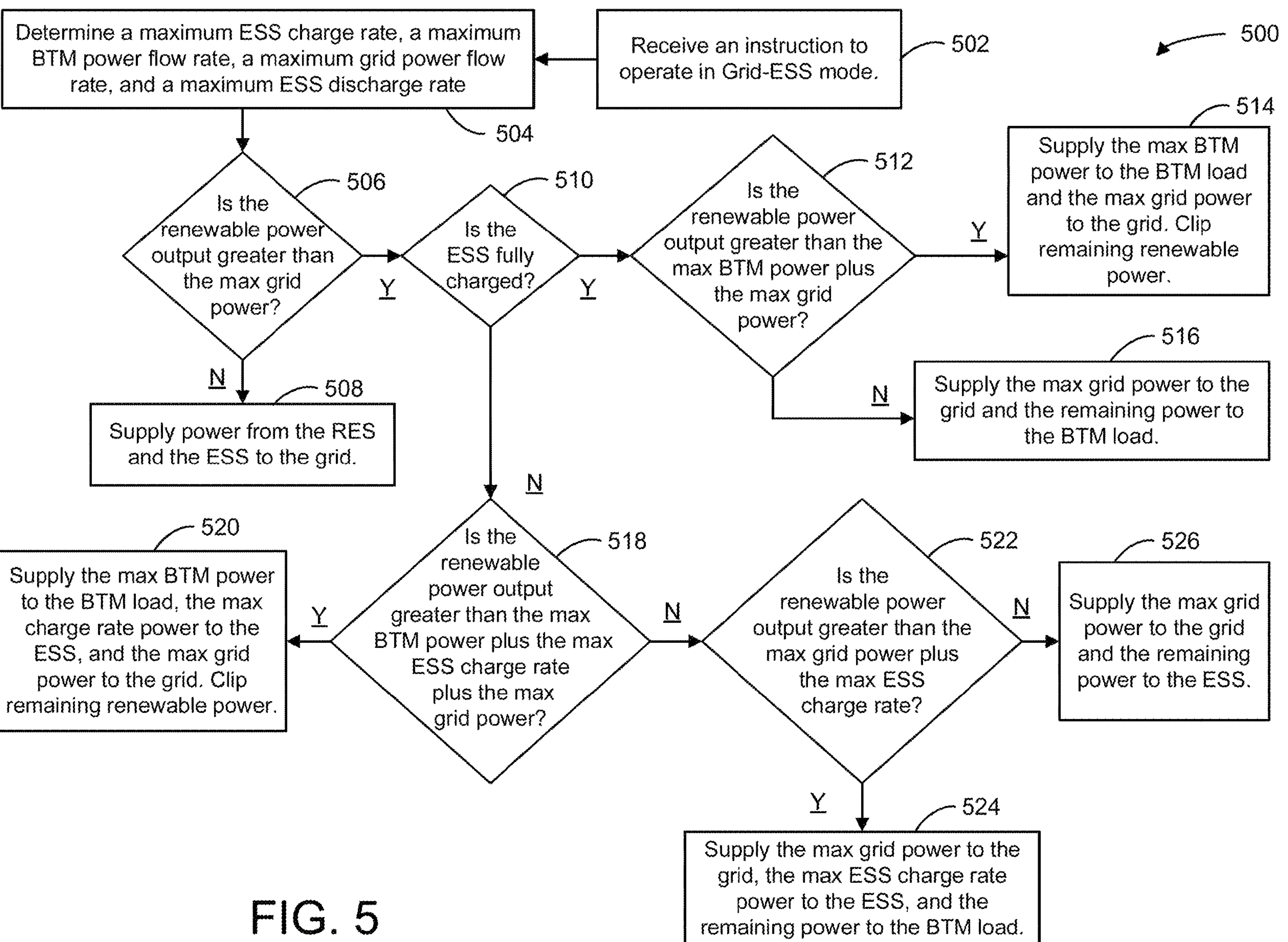

FIG. 5 illustrates a method 500 for controlling the flow of electricity in a RES-ESS to prioritize supplying power to a power grid, according to some embodiments. The method 500 can be performed by a processing circuit (e.g., a controller, a computer, the controller 204, the RES SCADA controller 12, etc.). In some embodiments, the processing circuit is the controller of a renewable energy plant that contains a RES configured to supply power to an ESS, to a BTM load, and to a grid. For example, the processing circuit may be the controller 204 that is configured to control the RES-ESS 300. The processing circuit may control equipment that operates to control the flow of electricity in the renewable energy plant. The processing circuit may control the flow of power such that supplying power to the grid and the ESS is prioritized over supplying power to the BTM load. The method 500 may preferably be executed when there is relatively high demand on the grid, such as during the evening, especially during summer months when grid customers are using air conditioning. The method 500 may include more or fewer operations, and the operations may be performed in any order, except where specified.

At operation 502 of the method 500, the processing circuit receives an instruction to operate in Grid-ESS mode. In Grid-ESS mode, supplying power from the RES to the grid is prioritized over supplying power to the ESS and the BTM load, and supplying power from the RES to the ESS is prioritized over supplying power to the grid. Referring to the RES-ESS 300, power from the RES 308 may be preferably supplied to the grid 306 before power is supplied to the ESS 316, and power may be preferably supplied to the ESS 316 before power is supplied to the BTM load 314.

At operation 504 of the method 500, processing circuit may determine a maximum power level for several components of the RES-ESS. The maximum power levels may include a maximum ESS charge rate, a maximum BTM input power level, a maximum grid input power level, and a maximum ESS discharge rate.

At operation 506 of the method 500, the processing circuit determines whether the renewable power output is greater than the maximum grid input power level. If the renewable power output is greater than the maximum grid input power level, the RES may supply the maximum grid input power level to the grid with additional power remaining. If the renewable power output is not greater than the maximum grid input power level, additional power may be supplied to the grid from the ESS, if necessary.

If it is determined at operation 506 that the renewable power output is less than the maximum grid input power, the method 500 may proceed to operation 508. At operation 508, all of the power from the RES plus additional power from the ESS is supplied to the grid. The amount of power supplied from the ESS to the grid may be equal to the maximum grid input power level minus the renewable power, such that the grid receives a maximum grid input power level. If the renewable power output plus the maximum ESS power output is less than the maximum grid input power level, or if the ESS has insufficient charge, the grid may receive less than the maximum grid input power level.

Referring to the RES-ESS 300 of FIG. 3, at operation 508, the controller 204 may instruct the flow control equipment 312 to cause the RES 308 to supply all of the renewable power output 336 to the grid 306 via the RES inverter 320 and the POI 348. The controller 204 may then determine the difference between the power supplied to the grid by the RES 308 (e.g., all of the renewable power output 336) and the maximum grid input power 346 and instruct the ESS 316 to supply the determined amount of power to the grid 306 via the ESS inverter 322 and the POI 348. If the ESS 316 is unable to supply the determined amount of power, the ESS 316 may supply the lesser of the ESS inverter power-out limit 354 or the ESS power-out limit 360. If the ESS 316 has insufficient charge to supply power, the grid may receive only the renewable power output 336.

If it is determined at operation 506 that the renewable power output is greater than the maximum grid input power, the method 500 may proceed to operation 510. At operation 510, the processing circuit determines whether the ESS is fully charged. If the ESS is fully charged, no power may be delivered to the ESS, and any excess power can be delivered to the BTM load 314 or clipped.

If it is determined at operation 510 that the ESS is fully charged, the method 500 may proceed to operation 512. At operation 512, the processing circuit determines whether the renewable power output is greater than the maximum BTM input power level plus the maximum grid input power level. If the renewable power output is greater than the maximum BTM input power level plus the maximum grid input power level, and the ESS is fully charged, the excess power may be clipped at a RES inverter. If the renewable power output is not greater than the maximum BTM input power level plus the maximum grid input power level, the maximum grid input power level may be supplied to the grid, and the remaining power may be supplied to the BTM load.

If it is determined at operation 512 that the renewable power output is greater than the maximum BTM input power level plus the maximum grid power level, the method 500 may proceed to operation 514. At operation 514, the maximum BTM power is supplied to the BTM load, and the maximum grid input power is supplied to the grid. Because, as determined in operation 510, there is no available storage capacity in the ESS, and because both the BTM load and the grid are receiving their respective maximum power levels, the RES is producing more power than can be allocated to the components of the RES-ESS. Thus, the excess power may be clipped at a RES inverter.

Referring to the RES-ESS 300 of FIG. 3, at operation 514, the controller 204 may instruct the flow control equipment 312 to cause the maximum BTM power 340 to flow to the BTM load 314 from the RES 308, via the RES inverter 320 and the BTM inverter 324, and the maximum grid input power 346 to flow to the grid 306 from the RES 308, via the RES inverter 320 and the POI 348. The controller 204 may then calculate the difference between the renewable power output 336 and the total amount of power supplied to the BTM load 314 and the grid 306 to determine the excess power output of the RES 308. Because it was determined at operation 510 that the ESS 316 is fully charged, and the grid 306 and BTM load 314 are each receiving their respective maximum amounts of power, this excess power may not be able to be supplied to any of the loads in the system 300. The controller 204 may instruct the RES inverter 320 to clip the excess power and treat it as clipped power 334.

If it is determined at operation 512 that the renewable power output is not greater than the maximum BTM input power level plus the maximum grid power level, the method 500 may proceed to operation 516. At operation 516, the maximum grid input power is supplied to the grid, and the remaining power is supplied to the BTM load. Because, as determined in operation 510, there is no available storage capacity in the ESS, power is instead supplied to the BTM load, despite the preference for supplying power to the ESS. Referring to the RES-ESS 300 of FIG. 3, at operation 516, the controller 204 may instruct the flow control equipment 312 to cause the maximum grid input power to flow to the grid 306 from the RES 308, via the RES inverter 320 and the POI 348, and the remaining power to flow to the BTM load 314 from the RES 308, via the RES inverter 320 and the BTM inverter 324.

If it is determined at operation 510 that the ESS is not fully charged, the method 500 may proceed to operation 518. At operation 518, the processing circuit determines whether the renewable power output is greater than the maximum BTM input power level plus the maximum ESS charge rate plus the maximum grid input power level. If it is determined that the renewable power output is greater than the combined input power levels, the remaining power may be clipped at a RES inverter. If it is determined that the renewable power output is less than the combined input power levels, power may be supplied to the grid and the ESS, and, if additional power remains, to the BTM load.

If it is determined at operation 518 that the renewable power output is greater than the maximum BTM input power level plus the maximum ESS charge rate plus the maximum grid input power level, the method 500 may proceed to operation 520. At operation 520, power is supplied to the grid at the maximum grid input power level, power is supplied to the ESS at the maximum charge rate, and powers supplied to the BTM load at the maximum BTM input power level. The excess power produced by the RES may be clipped at a RES inverter. Referring to the RES-ESS 300 of FIG. 3, at operation 518, the controller 204 may determine that the renewable power output 336 exceeds the combined maximum input power levels of the ESS 316, the BTM load 314, and the grid 306. At operation 520, the controller 204 may instruct the flow control equipment 312 to cause the maximum BTM power 340 to flow to the BTM load 314 from the RES 308, via the RES inverter 320 and the BTM inverter 324, power to flow to the ESS 316 at the maximum charge rate 358, via the RES inverter 320 and the ESS inverter 322, and the maximum grid input power 346 to flow to the grid 306 from the RES 308, via the RES inverter 320 and the POI 348. Because all of the loads in the system 300 are receiving power at their respective maximum capacities, the controller 204 may instruct the RES inverter 320 to clip the excess power and treat it as clipped power 334.

If it is determined at operation 518 that the renewable power output is not greater than the maximum BTM input power level plus the maximum ESS charge rate plus the maximum grid input power level, the method 500 may proceed to operation 522. At operation 522, the processing circuit determines whether the renewable power output is greater than the maximum grid input power level plus the maximum ESS charge rate. If the renewable power output is greater than the maximum grid input power level plus the maximum ESS charge rate, the remaining power may be supplied to the BTM load. If the renewable power output is not greater than the maximum grid input power level plus the maximum ESS charge rate, the maximum grid input power level may be supplied to the grid, and the remaining power may be supplied to the ESS.

If it is determined at operation 522 that the renewable power output is greater than the maximum BTM input power level plus the maximum ESS charge rate, the method 500 may proceed to operation 524. At operation 524, power may be supplied to the grid at the maximum grid input power level, and power may be supplied to ESS at the maximum ESS charge rate. The remaining power may be supplied to the BTM load.

If it is determined at operation 522 that the renewable power output is not greater than the maximum grid input power level plus the maximum ESS charge rate, the method 500 may proceed to operation 526. At operation 526, power may be supplied to the grid at the maximum grid input power level, and the remaining power may be supplied to the ESS. Because there is no additional power remaining, no power may be supplied to the BTM load.

Referring to the RES-ESS 300 of FIG. 3, at operation 522, the controller 204 may determine that the renewable power output 336 exceeds the combined maximum input power levels of the BTM load 314 and the ESS 316. At operation 524, the controller 204 may instruct the flow control equipment 312 to cause the maximum grid input power 346 to flow to the grid 306 from the RES 308, via the RES inverter 320 and the POI 348, and power to flow to the ESS 316 from the RES 308 at the maximum charge rate 358, via the RES inverter 320 and the ESS inverter 322. The controller 204 may then instruct the flow control equipment 312 to cause remaining power to flow to the BTM load 314 from the RES 308, via the RES inverter 320 and the BTM inverter 324. If the controller 204 determines, at operation 522, that the renewable power output 336 does not exceed the combined maximum input power levels of the grid 306 and the ESS 316, the controller 204 may instruct the flow control equipment 312 to cause the maximum grid input power 346 to flow to the grid 306 from the RES 308, via the RES inverter 320 and the POI 348, and the remaining power to flow to the ESS 316 from the RES 308, via the RES inverter 320 and the ESS inverter 322. No power may be supplied to the BTM load 314 because supplying power to the grid 306 and ESS 316 is prioritized over supplying power to the BTM load 314 in the Grid-ESS mode.

The method 500 may ensure that, in the Grid-ESS mode, available power generated by the RES is first supplied to the grid, and the remaining power is supplied to the ESS. Power may only be supplied to the BTM load when no additional power can be supplied to the grid or the ESS.

The controller 204 may receive instructions to control the RES-ESS 300 in BTM-ESS mode (e.g., in operation 402 of the method 400) or in Grid-ESS mode (e.g., in operation 502 of the method 500) based on a preset schedule. For example, the schedule retriever 222 may retrieve a schedule from the schedule database 232. The power flow controller 224 may then send signals to the flow control equipment via the communication interface to operate the RES-ESS 300 in the scheduled mode. For example, the schedule may instruct the controller 204 to operate the RES-ESS 300 in BTM-ESS mode during the winter and overnight during summer months. The schedule may instruct the controller 204 to operate the RES-ESS 300 in grid-ESS mode during the day and evenings during summer months to accommodate high demand periods on the grid. In some embodiments, a user may manually choose a mode via a user interface of the controller 204. The user interface module 228 may receive the user selection, which may override any preset schedules, and the energy controller may send signals to the flow control equipment via the communication interface to operate the RES-ESS 300 in the selected mode.

Figure 6:
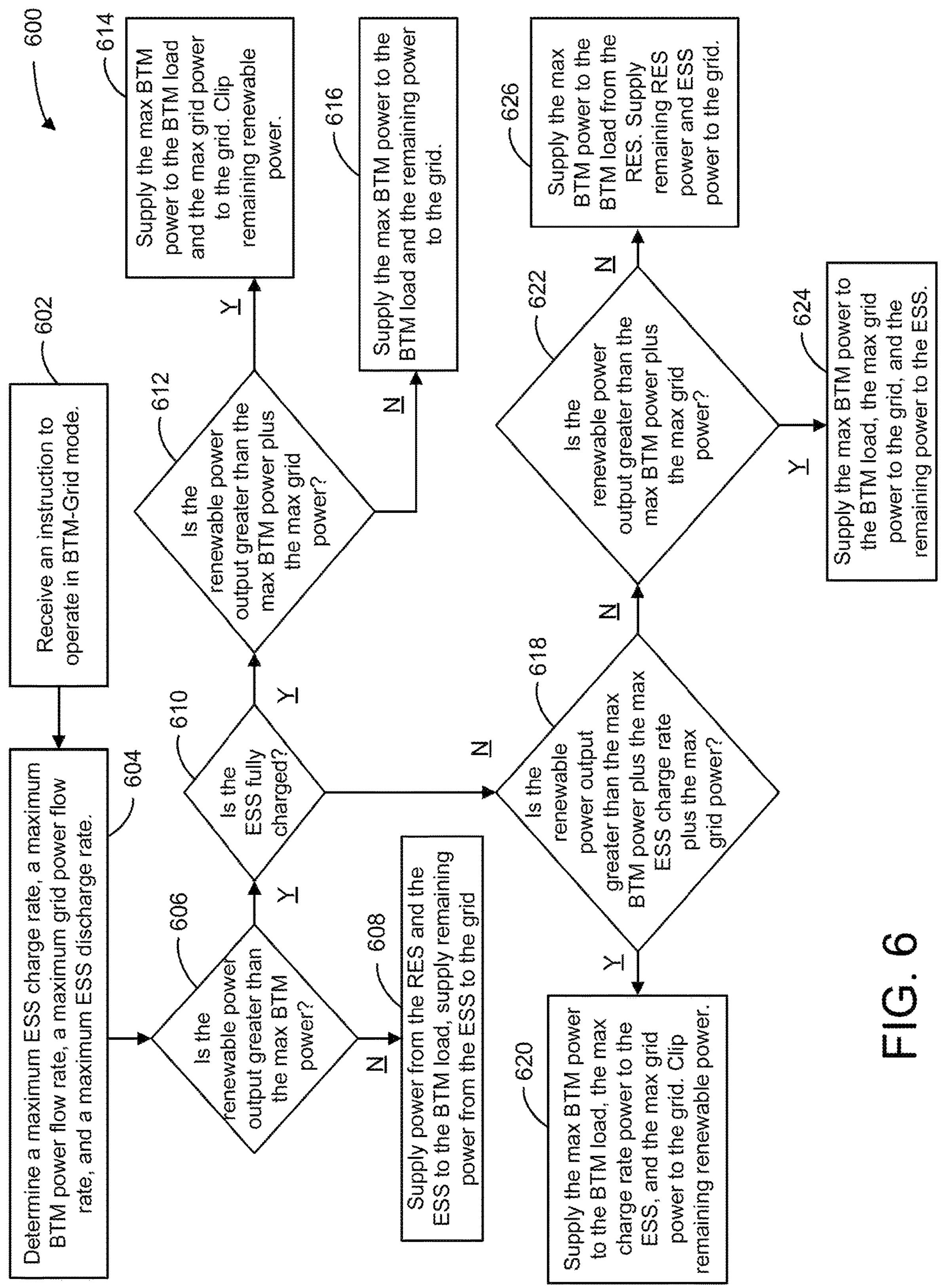

Other analogous modes may also be executed in similar ways to the BTM-ESS mode and the Grid-ESS mode. For example, FIG. 6 illustrates a method 600 for controlling the flow of electricity in a RES-ESS to prioritize supplying power to a BTM load and a power grid (e.g., a BTM-Grid mode), according to some embodiments. The method 600 can be performed by a processing circuit (e.g., a controller, a computer, the controller 204, the RES SCADA controller 12, etc.). The method 600 may be substantially similar to the methods 400, 500, with each operation corresponding to the operations of the methods 400, 500 having the same last two digits (e.g., operation 602 is similar to operations 402 and 502, etc.).

At operation 602 of the method 600, the processing circuit receives an instruction to operate in BTM-Grid mode, prioritizing the BTM load and the grid, in that order. At operation 604 of the method 600, processing circuit may determine a maximum ESS charge rate, a maximum BTM input power level, a maximum grid input power level, and a maximum ESS discharge rate. At operation 606 of the method 600, the processing circuit may determine whether the renewable power output is greater than the maximum BTM input power level. If it is determined that the renewable power output is not greater than the maximum BTM input power level, the method may proceed to operation 608.

At operation 608, power is supplied from the RES and the ESS to the BTM load. If the power output from the RES combined with the power output from the ESS at the maximum discharge rate does not exceed the maximum BTM input power level, all of the power output from the RES and the ESS may be supplied to the BTM load. If the power output from the RES combined with the power output from the ESS at the maximum discharge rate exceeds the maximum BTM input power level, the remaining output power may be supplied to the grid. If the power output from the RES combined with the power output from the ESS at the maximum discharge rate exceeds the combined maximum BTM input power level and maximum grid input power level, the ESS may output power at less than its maximum discharge rate so the maximum grid input power level and the maximum BTM input power level are not exceeded.

If it is determined at operation 606 that the renewable power output is not greater than the maximum BTM input power level, the method may proceed to operation 610. At operation 610, the processing circuit determines whether the ESS is fully charged. If it is determined at operation 610 that the ESS is fully charged, the method 600 may proceed to operation 612. At operation 612, the processing circuit determines whether the renewable power output is greater than the maximum BTM input power level plus the maximum grid input power level. If it is determined at operation 612 that the renewable power output is greater than the maximum BTM input power level plus the maximum grid input power level, the method 600 may proceed to operation 614. At operation 614, the maximum BTM power is supplied to the BTM load, and the maximum grid input power is supplied to the grid. Because, as determined in operation 610, there is no available storage capacity in the ESS, and because both the BTM load and the grid are receiving their respective maximum power levels, the RES is producing more power than can be allocated to the components of the RES-ESS. Thus, the excess power may be clipped at an RES inverter. If it is determined at operation 612 that the renewable power output is not greater than the maximum BTM input power level plus the maximum grid input power level, the method 600 may proceed to operation 616. At operation 616, the maximum BTM power is supplied to the BTM load, and the remaining power is supplied to the grid.

If it is determined at operation 610 that the ESS is not fully charged, the method 600 may proceed to operation 618. At operation 618, the processing circuit determines whether the renewable power output is greater than the maximum BTM input power level plus the maximum ESS charge rate plus the maximum grid input power level. If it is determined at operation 618 that the renewable power output is greater than the combined input power levels, the method 600 may proceed to operation 620. At operation 620, power is supplied to the BTM load at the maximum BTM power, to the ESS at the maximum charge rate, and to the grid at the maximum grid input power level. The remaining power may be clipped at a RES inverter. If it is determined at operation 618 that the renewable power output is not greater than the combined input power levels, the method 600 may proceed to operation 622.

At operation 622, the processing circuit determines whether the renewable power output is greater than the maximum BTM input power level plus the maximum grid input power level. If it is determined that operation 622 that the renewable power output is greater than the maximum BTM input power level plus the maximum grid input power level, the method 600 may proceed to operation 624. At operation 624, power is supplied to the BTM load at the maximum BTM input power level and to the grid at the maximum grid input power level. The remaining power may then be supplied to ESS. If it is determined that operation 622 that the renewable power output is not greater than the maximum BTM input power level plus the maximum grid input power level, the method 600 may proceed to operation 626. At operation 626, power may be supplied from the REPP to the BTM load at the maximum BTM input power level, and the remaining power from the RES may be supplied to the grid. If the ESS has stored power, power may be supplied to the grid from the ESS up to the maximum discharge rate of the ESS or such that the combined power supplied from the ESS and the RES does not exceed the maximum grid input power level. In some embodiments, at operation 626 either or both of the RES and the ESS may supply either or both of the grid and the BTM load. However, in any case, power may be supplied to the BTM load up to the maximum BTM input power level before power is supplied to the grid.

Figure 7:
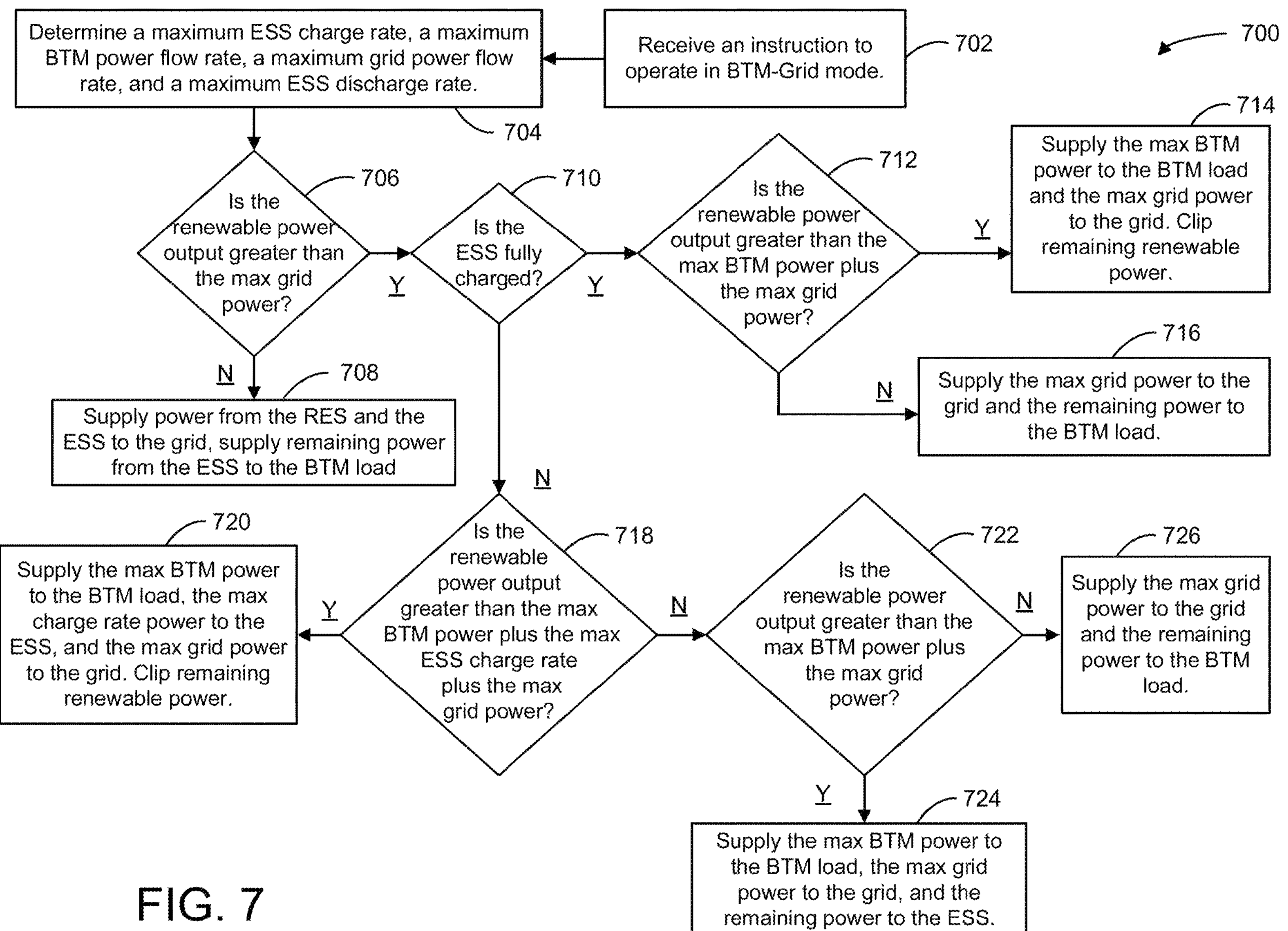

FIG. 7 illustrates a method 700 for controlling the flow of electricity in a RES-ESS to prioritize supplying power to a power grid and a BTM load (e.g., a Grid-BTM mode), according to some embodiments. The method 700 can be performed by a processing circuit (e.g., a controller, a computer, the controller 204, the RES SCADA controller 12, etc.). The method 700 may be substantially similar to the methods 400, 500, 600 with each operation corresponding to the operations of the methods 400, 500 having the same last two digits (e.g., operation 702 is similar to operations 402, 502, 602 etc.).

At operation 702 of the method 700, the processing circuit receives an instruction to operate in BTM-Grid mode, prioritizing the BTM load and the grid, in that order. At operation 704 of the method 700, the processing circuit may determine a maximum ESS charge rate, a maximum BTM input power level, a maximum grid input power level, and a maximum ESS discharge rate. At operation 706 of the method 700, the processing circuit may determine whether the renewable power output is greater than the maximum grid input power level. If it is determined that the renewable power output is not greater than the maximum BTM input power level, the method may proceed to operation 708.

At operation 708, power is supplied from the RES and the ESS to the grid. If the power output from the RES combined with the power output from the ESS at the maximum discharge rate does not exceed the maximum grid input power level, all of the power output from the RES and the ESS may be supplied to the grid. If the power output from the RES combined with the power output from the ESS at the maximum discharge rate exceeds the maximum grid input power level, the remaining output power may be supplied to the BTM. If the power output from the RES combined with the power output from the ESS at the maximum discharge rate exceeds the combined maximum BTM input power level and maximum grid input power level, the ESS may output power at less than its maximum discharge rate so the maximum grid input power level and the maximum BTM input power level are not exceeded.

If it is determined at operation 706 that the renewable power output is not greater than the maximum BTM input power level, the method may proceed to operation 710. At operation 710, the processing circuit determines whether the ESS is fully charged. If it is determined at operation 710 that the ESS is fully charged, the method 700 may proceed to operation 712. At operation 712, the processing circuit determines whether the renewable power output is greater than the maximum BTM input power level plus the maximum grid input power level. If it is determined at operation 712 that the renewable power output is greater than the maximum BTM input power level plus the maximum grid input power level, the method 700 may proceed to operation 714. At operation 714, the maximum BTM power is supplied to the BTM load, and the maximum grid input power is supplied to the grid. Because, as determined in operation 710, there is no available storage capacity in the ESS, and because both the BTM load and the grid are receiving their respective maximum power levels, the RES is producing more power than can be allocated to the components of the RES-ESS. Thus, the excess power may be clipped at an RES inverter. If it is determined at operation 712 that the renewable power output is not greater than the maximum BTM input power level plus the maximum grid input power level, the method 700 may proceed to operation 716. At operation 716, the maximum grid input power is supplied to the grid, and the remaining power is supplied to the BTM load.

If it is determined at operation 710 that the ESS is not fully charged, the method 700 may proceed to operation 718. At operation 718, the processing circuit determines whether the renewable power output is greater than the maximum BTM input power level plus the maximum ESS charge rate plus the maximum grid input power level. If it is determined at operation 718 that the renewable power output is greater than the combined input power levels, the method 700 may proceed to operation 720. At operation 720, power is supplied to the BTM load at the maximum BTM power, to the ESS at the maximum charge rate, and to the grid at the maximum grid input power level. The remaining power may be clipped at a RES inverter. If it is determined at operation 718 that the renewable power output is not greater than the combined input power levels, the method 700 may proceed to operation 722.

At operation 722, the processing circuit determines whether the renewable power output is greater than the maximum BTM input power level plus the maximum grid input power level. If it is determined that operation 722 that the renewable power output is greater than the maximum BTM input power level plus the maximum grid input power level, the method 700 may proceed to operation 724. At operation 724, power is supplied to the BTM load at the maximum BTM input power level and to the grid at the maximum grid input power level. The remaining power may then be supplied to ESS. If it is determined that operation 722 that the renewable power output is not greater than the maximum BTM input power level plus the maximum grid input power level, the method 700 may proceed to operation 726. At operation 726, power may be supplied to the grid from the RES at the maximum grid input power level, and the remaining power may be supplied to the BTM load. If the ESS has stored power, power may be supplied to the BTM load from the ESS up to the maximum discharge rate of the ESS or such that the combined power supplied from the ESS and the RES does not exceed the maximum BTM input power level. In some embodiments, at operation 726, either or both of the RES and the ESS may supply either or both of the grid and the BTM load. However, in any case, power may be supplied to the grid up to the maximum grid input power level before power is supplied to the BTM load.

It should be understood that the methods 400, 500, 600, 700 are non-limiting examples, and other methods of prioritizing the loads and controlling the flow of power in the system 300 are contemplated. For example, prioritization modes that prioritize providing power to the ESS 316 are also contemplated. Further, other prioritization modes may include shared prioritization of multiple loads according to a determined ration. For example, in a 50/50 BTM/Grid mode, available power from the RES 308 may be distributed equally to the BTM load 314 and the grid 306, while any excess power may be supplied to the ESS 316. If the RES 308 does not supply enough power to meet the maximum input limits of the BTM load 314 and the grid 306, the ESS 316 may also supply power to the BTM load 314 and the grid 306. The controller may determine any ratio of power prioritization and any combination of loads (e.g., 25/75 Grid/ESS, 60/30/10 BTM/Grid/ESS, etc.). As in the prioritization modes discussed above, the controller 204 may determine the mode and the power distribution ratio based on current or expected weather in the vicinity of the RES 308, the SOC of the ESS 316, a time of day, a time of year, current or expected demand for power from the grid 306, current or expected available power from the grid 306, or current or expected demand for power from the BTM load 314.

In an aspect, a system for controlling power distribution between a renewable energy source (RES) that generates electrical power, a power grid, an energy storage system (ESS) coupled to and configured to store electrical power from the RES and the power grid, and a behind-the-meter (BTM) load coupled to and configured to receive electrical power from the RES, the ESS, and the power grid is provided. The system includes a controller including a processor and a non-transitory computer readable storage medium comprising instructions stored thereon that, upon execution by the processor, cause the controller to determine a prioritization mode and control the flow of electrical power in the system based on the prioritization mode.

In some embodiments, controlling the flow of electrical power in the system comprises sending instructions to an RES inverter electrically coupled to the RES, an ESS inverter electrically coupled to the ESS, and/or a BTM inverter electrically coupled to the BTM load.

In some embodiments, when the RES-generated power exceeds the combined maximum input power of the ESS, the BTM load, and the grid, the RES inverter is configured to clip the excess RES-generated power.

In some embodiments, the prioritization mode is one of a BTM-ESS mode, a Grid-ESS mode, a Grid-BTM mode, and a BTM-Grid mode. In the BTM-ESS mode, the RES-generated power is preferably supplied to the BTM load, and any remaining RES-generated power is preferably supplied to the ESS. In the Grid-ESS mode, the RES-generated power is preferably supplied to the grid load, and any remaining RES-generated power is preferably supplied to the ESS. In the Grid-BTM mode, the RES-generated power is preferably supplied to the grid, and any remaining RES-generated power is preferably supplied to the BTM load. In the BTM-Grid mode, the RES-generated power is preferably supplied to the BTM load, and any remaining RES-generated power is preferably supplied to the grid.

In some embodiments, the prioritization mode is the BTM-ESS mode, wherein in the BTM-ESS mode, RES-generated power is supplied to the grid only if (a) a maximum BTM input power is supplied to the BTM load and a maximum ESS input power is supplied to the ESS or (b) if the maximum BTM input power is supplied to the BTM load and the ESS is at a maximum state of charge (SOC). In some embodiments, in the BTM-ESS mode, power from the ESS is supplied to the BTM load only if the power generated by the RES is less than a maximum input power of the BTM load. In some embodiments, in the BTM-ESS mode, power from the grid is supplied to the BTM load if the power generated by the RES is less than a maximum input power of the BTM load. In some embodiments, in the BTM-ESS mode, power from the grid is supplied to the ESS if the power generated by the RES is more than a maximum input power of the BTM load but less than a maximum combined input power of the ESS and the BTM load.

In some embodiments, the prioritization mode is the Grid-ESS mode, wherein in the Grid-ESS mode, RES-generated power is supplied to the BTM load only if (a) a maximum grid input power is supplied to the grid and a maximum ESS input power is supplied to the ESS or (b) if the maximum grid input power is supplied to the grid and the ESS is at a maximum SOC. In some embodiments, the Grid-ESS mode, power from the ESS is supplied to the grid only if the power generated by the RES is less than a maximum input power of the grid.

In some embodiments, the prioritization mode is the Grid-BTM mode, wherein in the Grid-BTM mode, when the ESS is above a minimum SOC, power is supplied from the ESS (a) to the grid when the RES generates less power than a maximum input power of the grid and (b) to the BTM load when the RES generates more power than a maximum input power of the grid but less power than a maximum combined input power of the grid and the BTM load.

In some embodiments, the prioritization mode is the BTM-Grid mode, wherein in the BTM-Grid mode, when the ESS is above a minimum SOC, power is supplied from the ESS (a) to the BTM load only when the RES generates less power than a maximum input power of the BTM load and (b) to the grid only when the RES generates more power than a maximum input power of the BTM load but less power than a maximum combined input power of the grid and the BTM load.

In some embodiments, determining the prioritization mode includes receiving information including at least one of: current or expected weather in the vicinity of the RES, a time of day, a time of year, current or expected demand for power from the grid, or current or expected demand for power from the BTM load, and further includes determining the prioritization mode based on the information.

In some embodiments, determining the prioritization mode includes retrieving a prioritization schedule from a schedule database and determining the prioritization mode based on the schedule.

In some embodiments, the BTM load is configured to receive power from the RES and the ESS without the power being transmitted over the grid.

In another aspect, a non-transitory computer readable storage medium in an energy control system including instructions stored thereon is provided. Upon execution by a processor, the instructions cause the processor to determine a prioritization mode for a system including a RES, an ESS, and a BTM load each coupled to a power grid. The prioritization mode determines which of the ESS, the BTM load, or the grid is prioritized in distributing power from the RES. The instructions further cause the processor to send commands to flow control equipment of the system to control the flow of power based on the determined prioritization.

In some embodiments, the flow control equipment comprises a plurality of inverters, each inverter configured to control the flow of power therethrough. In some embodiments, the plurality of inverters includes an ESS inverter configured to control the amount of power flowing into and out of the ESS, an RES inverter configured to control the amount of RES-generated power delivered to the system and the amount of RES-generated power what is clipped, and a BTM inverter configured to control the amount of power flowing into the BTM load.

In some embodiments, the prioritization mode is one of a BTM-ESS mode, a Grid-ESS mode, a Grid-BTM mode, and a BTM-Grid mode. In the BTM-ESS mode, the RES-generated power is preferably supplied to the BTM load, and any remaining RES-generated power is preferably supplied to the ESS. In the Grid-ESS mode, the RES-generated power is preferably supplied to the grid, and any remaining RES-generated power is preferably supplied to the ESS. In the Grid-BTM mode, the RES-generated power is preferably supplied to the grid, and any remaining RES-generated power is preferably supplied to the BTM load. In the BTM-Grid mode, the RES-generated power is preferably supplied to the BTM load, and any remaining RES-generated power is preferably supplied to the grid.

In some embodiments, determining the prioritization mode includes receiving information including at least one of current or expected weather in the vicinity of the RES, a time of day, a time of year, current or expected demand for power from the grid, or current or expected demand for power from the BTM load, and further includes determining the prioritization mode based on the information.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. A system for controlling power distribution between a renewable energy source (RES) that generates electrical power, a power grid, an energy storage system (ESS) coupled to and configured to store electrical power from the RES and the power grid, and a behind-the-meter (BTM) load coupled to and configured to receive electrical power from the RES, the ESS, and the power grid, the system comprising:

a controller including a processor and a non-transitory computer-readable storage medium comprising instructions stored thereon that, upon execution by the processor, cause the controller to:

determine a prioritization mode based on information comprising at least one of current or expected weather in the vicinity of the RES, a time of day, a time of year, current or expected demand for power from the grid, or current or expected demand for power from the BTM load, wherein in the prioritization mode, RES-generated power is preferably supplied to one of the BTM load or the grid, and any remaining RES-generated power is preferably supplied to the other of the BTM load or the grid or to the ESS; and control the flow of electrical power in the system based on the prioritization mode.

2. The system of claim 1, wherein controlling the flow of electrical power in the system comprises sending instructions to an RES inverter electrically coupled to the RES, an ESS inverter electrically coupled to the ESS, and/or a BTM inverter electrically coupled to the BTM load.

3. The system of claim 2, wherein when the RES-generated power exceeds the combined maximum input power of the ESS, the BTM load, and the grid, the RES inverter is configured to clip the excess RES-generated power.

4. The system of claim 1, wherein the prioritization mode is one of:

a BTM-ESS mode in which the RES-generated power is preferably supplied to the BTM load, and any remaining RES-generated power is preferably supplied to the ESS;

a Grid-ESS mode in which the RES-generated power is preferably supplied to the grid, and any remaining RES-generated power is preferably supplied to the ESS;

a Grid-BTM mode in which the RES-generated power is preferably supplied to the grid, and any remaining RES-generated power is preferably supplied to the BTM load; or a BTM-Grid mode in which the RES-generated power is preferably supplied to the BTM load, and any remaining RES-generated power is preferably supplied to the grid.

5. The system of claim 4, wherein the prioritization mode is the BTM-ESS mode, wherein in the BTM-ESS mode, RES-generated power is supplied to the grid only if (a) a maximum BTM input power is supplied to the BTM load and a maximum ESS input power is supplied to the ESS or (b) if the maximum BTM input power is supplied to the BTM load and the ESS is at a maximum state of charge (SOC).

6. The system of claim 5, wherein in the BTM-ESS mode, power from the ESS is supplied to the BTM load only if the power generated by the RES is less than a maximum input power of the BTM load.

7. The system of claim 5, wherein in the BTM-ESS mode, power from the grid is supplied to the BTM load if the power generated by the RES is less than a maximum input power of the BTM load.

8. The system of claim 5, wherein in the BTM-ESS mode, power from the grid is supplied to the ESS if the power generated by the RES is more than a maximum input power of the BTM load but less than a maximum combined input power of the ESS and the BTM load.

9. The system of claim 4, wherein the prioritization mode is the Grid-ESS mode, wherein in the Grid-ESS mode, RES-generated power is supplied to the BTM load only if (a) a maximum grid input power is supplied to the grid and a maximum ESS input power is supplied to the ESS or (b) if the maximum grid input power is supplied to the grid and the ESS is at a maximum SOC.

10. The system of claim 9, wherein in the Grid-ESS mode, power from the ESS is supplied to the grid only if the power generated by the RES is less than a maximum input power of the grid.

11. The system of claim 4, wherein the prioritization mode is the Grid-BTM mode, wherein in the Grid-BTM mode, when the ESS is above a minimum SOC, power is supplied from the ESS (a) to the grid only when the RES generates less power than a maximum input power of the grid and (b) to the BTM load only when the power generated by the RES plus a maximum output power of the ESS exceeds a maximum input power of the grid and power generated by the RES does not exceed a maximum combined input power of the grid and the BTM load.

12. The system of claim 4, wherein the prioritization mode is the BTM-Grid mode, wherein in the BTM-Grid mode, when the ESS is above a minimum SOC, power is supplied from the ESS (a) to the BTM load only when the RES generates less power than a maximum input power of the BTM load and (b) to the grid only when the power generated by the RES plus a maximum output power of the ESS exceeds a maximum input power of the BTM load and power generated by the RES does not exceed a maximum combined input power of the grid and the BTM load.

13. The system of claim 4, wherein determining the prioritization mode comprises:

retrieving a prioritization schedule from a schedule database; and determining the prioritization mode based on the schedule.

14. The system of claim 1, wherein the BTM load is configured to receive power from the RES and the ESS without the power being transmitted over the grid.

15. A non-transitory computer-readable storage medium in an energy control system comprising instructions stored thereon that, upon execution by a processor, cause the processor to:

determine a prioritization mode for a system including a RES that generates power, an ESS configured to store power, and a BTM load each coupled to a power grid based on information comprising at least one of current or expected weather in the vicinity of the RES, a time of day, a time of year, current or expected demand for power from the grid, or current or expected demand for power from the BTM load, wherein in the prioritization mode, RES-generated power is preferably supplied to one of the BTM load or the grid, and any remaining RES-generated power is preferably supplied to the other of the BTM load or the grid or to the ESS; and send commands to flow control equipment of the system to control the flow of power in the system based on the determined prioritization mode.

16. The medium of claim 15, wherein the prioritization mode is one of:

a BTM-ESS mode in which the RES-generated power is preferably supplied to the BTM load, and any remaining RES-generated power is preferably supplied to the ESS;

a Grid-ESS mode in which the RES-generated power is preferably supplied to the grid, and any remaining RES-generated power is preferably supplied to the ESS;

a Grid-BTM mode in which the RES-generated power is preferably supplied to the grid, and any remaining RES-generated power is preferably supplied to the BTM load; or a BTM-Grid mode in which the RES-generated power is preferably supplied to the BTM load, and any remaining RES-generated power is preferably supplied to the grid.

17. The medium of claim 15, wherein the flow control equipment comprises a plurality of inverters, each inverter configured to control the flow of power therethrough.

18. The medium of claim 17, wherein the plurality of inverters includes an ESS inverter configured to control the amount of power flowing into and out of the ESS, an RES inverter configured to control the amount of RES-generated power delivered to the system and the amount of RES-generated power what is clipped, and a BTM inverter configured to control the amount of power flowing into the BTM load.

* * * * *